(12) United States Patent
Bukowski et al.

(10) Patent No.: US 12,548,679 B2
(45) Date of Patent: Feb. 10, 2026

(54) INDIVIDUAL OPTIMAL MODE OF DELIVERY

(71) Applicant: Board of Regents, The University of Texas System, Austin, TX (US)

(72) Inventors: Radek Bukowski, Austin, TX (US); Karl Schulz, Pflugerville, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 340 days.

(21) Appl. No.: 18/251,595

(22) PCT Filed: Nov. 4, 2021

(86) PCT No.: PCT/US2021/058009
§ 371 (c)(1),
(2) Date: May 3, 2023

(87) PCT Pub. No.: WO2022/098839
PCT Pub. Date: May 12, 2022

(65) Prior Publication Data
US 2024/0013925 A1   Jan. 11, 2024

Related U.S. Application Data

(60) Provisional application No. 63/110,217, filed on Nov. 5, 2020.

(51) Int. Cl.
*G16H 50/30* (2018.01)
*A61B 5/00* (2006.01)
(Continued)

(52) U.S. Cl.
CPC ........... *G16H 50/30* (2018.01); *A61B 5/4362* (2013.01); *A61B 5/7264* (2013.01); *G16H 10/20* (2018.01); *G16H 10/60* (2018.01)

(58) Field of Classification Search
None
See application file for complete search history.

(56) References Cited

U.S. PATENT DOCUMENTS

2005/0267377 A1   12/2005   Marossero et al.
2009/0299212 A1*  12/2009   Principe .................. G16Z 99/00
                                                      600/588
(Continued)

OTHER PUBLICATIONS

Application No. PCT/US2021/058009, International Preliminary Report on Patentability, Mailed on May 19, 2023, 10 pages.

(Continued)

*Primary Examiner* — Michael T. Holtzclaw
(74) *Attorney, Agent, or Firm* — Kilpatrick Townsend & Stockton LLP

(57) ABSTRACT

A method can include receiving, at a computer system, characteristic values of a pregnancy of a subject. As an example, the characteristic values can include a numerical value for a live birth order of the pregnancy for the subject. The computer system can store a machine learning model that receives a first set of input features and provides a second set of one or more output values. In some embodiments, the first set of input features can correspond to the characteristic values of the pregnancy of the subject. The second set of one or more output values can include a probability of a Cesarean delivery. The characteristic values can be input into the machine learning model to obtain the probability of the Cesarean delivery being required for the subject during an attempt of a vaginal delivery. The Cesarean delivery can be performed based on the probability.

19 Claims, 16 Drawing Sheets

(51) Int. Cl.
*G16H 10/20* (2018.01)
*G16H 10/60* (2018.01)

(56) References Cited

U.S. PATENT DOCUMENTS

| | | | |
|---|---|---|---|
| 2011/0192398 A1 | 8/2011 | Euliano et al. | |
| 2015/0327799 A1* | 11/2015 | Vosch | A61B 5/0075 600/323 |
| 2016/0106378 A1* | 4/2016 | Kyal | A61B 5/352 600/528 |
| 2018/0114600 A1* | 4/2018 | Roberts | G16B 40/00 |
| 2018/0172698 A1 | 6/2018 | Boniface et al. | |
| 2020/0196958 A1 | 6/2020 | Penders et al. | |
| 2020/0292554 A1 | 9/2020 | Jelliffe et al. | |
| 2023/0114033 A1* | 4/2023 | Shazly | G16H 50/50 705/2 |

OTHER PUBLICATIONS

Application No. PCT/US2021/058009, International Search Report and the Written Opinion, Mailed on Feb. 2, 2022, 12 pages.

Pallasmaa, et al., Cesarean delivery in Finland: maternal complications and obstetric risk factors, Acta Obstetricia et Gynecologica Scandinavica, Jul. 2010, 896-902 pp. 89-97.

Hall, et al., Maternal mortality and mode of delivery, The Lancet, 1999, p. 776, vol. 354.

Chen, et al., XGBoost: A Scalable Tree Boosting System, KDD '16: Proceedings of the 22nd ACM SIGKDD International Conference on Knowledge Discovery and Data Mining, Aug. 2016, pp. 785-794, New York, NY, USA.

Ganganwar, An overview of classification algorithms for imbalanced datasets, International Journal of Emerging Technology and Advanced Engineering, Apr. 2012, pp. 42-47, vol. 2, Issue 4.

Schulz, et al., Cluster Computing with OpenHPC, In: Proceedings of HPC Systems Professionals Workshop, HPCSYSPROS '16, 2016, 6 Pages.

Grobman et al., "Development of a Nomogram for Prediction of Vaginal Birth After Cesarean Delivery;" Obstetrics & Gynecology; vol. 109; No. 4; pp. 806-812; Apr. 2007.

Grobman et al., "Prediction of uterine rupture associated with attempted vaginal birth after cesarean delivery," American Journal of Obstetrics & Gynecology; 199:30.e1-30.e5; pp. 1-5; Jul. 2008.

* cited by examiner

| Parameter | Variable Description | Feature Type | | |
|---|---|---|---|---|
| | | Numerical | Binary | Categorical |
| parameters known at $t_{early}$ | | | | |
| mager | mother's age | X | | |
| lbo | live birth order (recode) | X | | |
| tbo | total birth order (recode) | X | | |
| bmi r | body mass index (recode) | X | | |
| pwgt r | pre-pregnancy weight (recode) | X | | |
| mbrace | mother's bridged race | | | X |
| umhisp | mother's hispanic origin | | | X |
| rf ppterm | previous preterm birth? | | X | |
| rf cesar | previous C-sections? | | X | |
| rf cesarn | number of previous C-sections | X | | |
| rf diab | prepregnancy diabetes | | X | |
| rf phyp | prepregnancy hypertension | | X | |
| cig 0 | pre-pregnancy cigarette use | X | | |
| cig 1 | cigarettes usage 1st trimester | X | | |
| additional parameters known at $t_{term}$ | | | | |
| rf ghyp | gestational hypertension | | X | |
| rf gest | gestational diabetes | | X | |
| cig 2 | cigarette usage 2nd trimester | X | | |
| cig 3 | cigarette usage 3rd trimester | X | | |
| previs rec | number of prenatal visits | X | | |
| combgest | gestational age in weeks | X | | |
| wtgain rec | weight gain (recode) | X | | |

FIG. 2

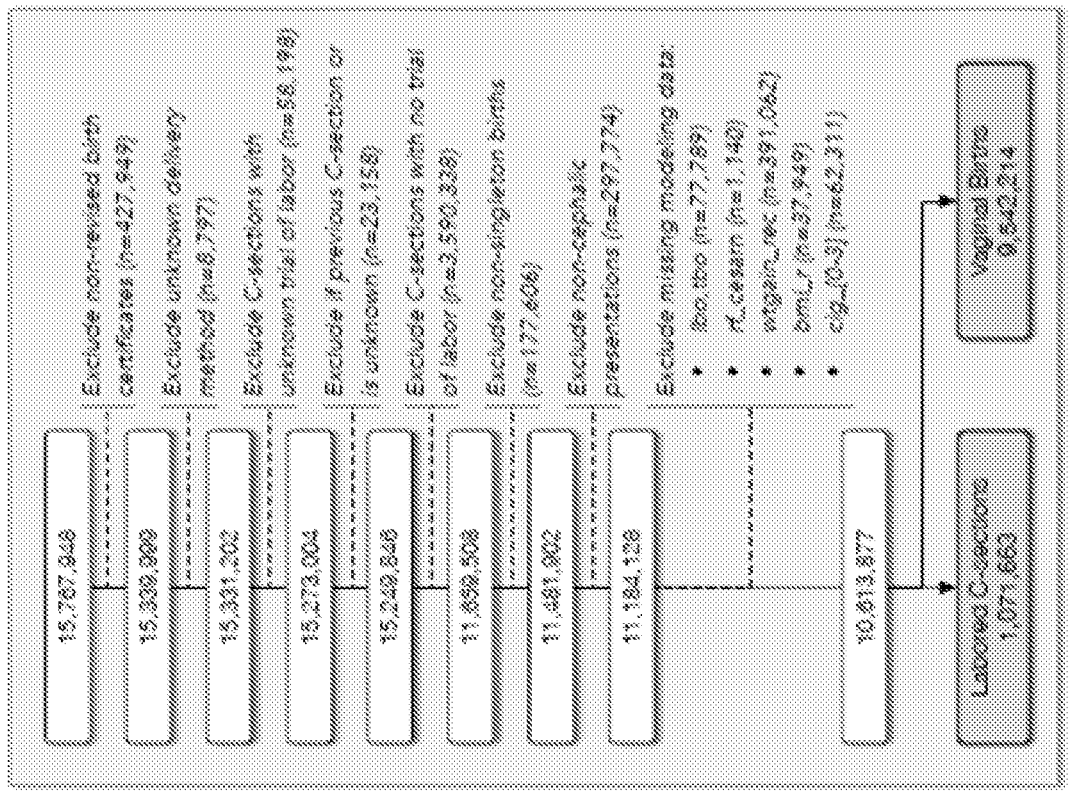
FIG. 5B  Testing cohort (births from 2014-2017)
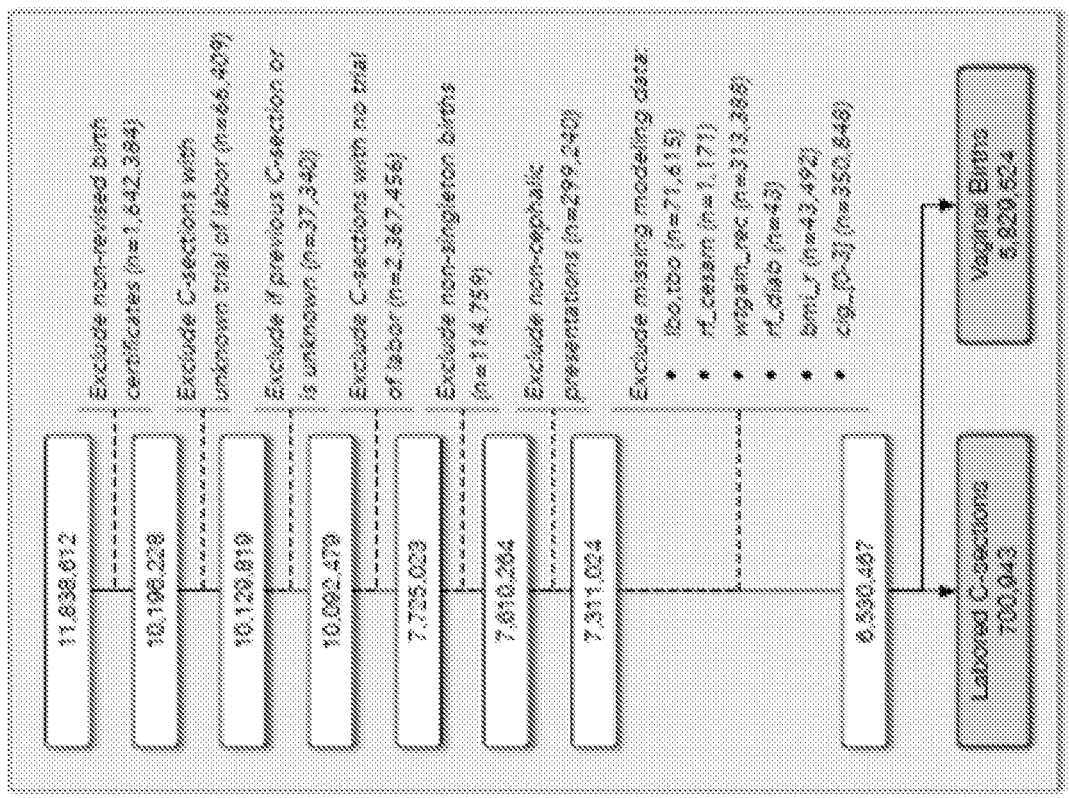
FIG. 5A  Training cohort (births from 2011-2013)

| Params | AUC | Accuracy | Recall | F1 | Brier | Time (sec) |
|---|---|---|---|---|---|---|
| | Logistic Regression [$t_{early}$] | | | | | |
| 5 | 0.751 ± 0.009 | 0.648 ± 0.024 | 0.748 ± 0.025 | 0.313 ± 0.009 | 0.208 ± 0.008 | 793.2 |
| 10 | 0.756 ± 0.009 | 0.652 ± 0.030 | 0.749 ± 0.026 | 0.316 ± 0.012 | 0.206 ± 0.012 | 1475.2 |
| 15 | 0.757 ± 0.009 | 0.655 ± 0.028 | 0.747 ± 0.024 | 0.318 ± 0.012 | 0.206 ± 0.011 | 1514.8 |
| 20 | 0.757 ± 0.009 | 0.655 ± 0.030 | 0.747 ± 0.026 | 0.317 ± 0.012 | 0.206 ± 0.012 | 1645.8 |
| 36 | 0.757 ± 0.009 | 0.655 ± 0.031 | 0.746 ± 0.027 | 0.318 ± 0.013 | 0.206 ± 0.012 | 9426.8 |
| | Logistic Regression [$t_{term}$] | | | | | |
| 5 | 0.756 ± 0.009 | 0.655 ± 0.017 | 0.749 ± 0.014 | 0.318 ± 0.008 | 0.206 ± 0.007 | 708.8 |
| 10 | 0.761 ± 0.008 | 0.670 ± 0.028 | 0.738 ± 0.026 | 0.325 ± 0.012 | 0.203 ± 0.012 | 554.2 |
| 15 | 0.765 ± 0.008 | 0.672 ± 0.030 | 0.741 ± 0.028 | 0.327 ± 0.012 | 0.202 ± 0.013 | 1519.0 |
| 20 | 0.767 ± 0.009 | 0.676 ± 0.028 | 0.740 ± 0.024 | 0.329 ± 0.012 | 0.201 ± 0.012 | 1736.6 |
| 41 | 0.767 ± 0.009 | 0.676 ± 0.030 | 0.740 ± 0.027 | 0.329 ± 0.013 | 0.201 ± 0.013 | 11803.8 |
| | XGBoost [$t_{early}$] | | | | | |
| 5 | 0.765 ± 0.009 | 0.635 ± 0.014 | 0.789 ± 0.013 | 0.317 ± 0.007 | 0.201 ± 0.008 | 655.4 |
| 10 | 0.769 ± 0.008 | 0.640 ± 0.019 | 0.788 ± 0.017 | 0.319 ± 0.008 | 0.199 ± 0.011 | 782.2 |
| 15 | 0.770 ± 0.008 | 0.640 ± 0.019 | 0.788 ± 0.017 | 0.320 ± 0.008 | 0.198 ± 0.010 | 769.2 |
| 20 | 0.770 ± 0.008 | 0.640 ± 0.019 | 0.788 ± 0.016 | 0.320 ± 0.008 | 0.199 ± 0.010 | 825.5 |
| 36 | 0.770 ± 0.008 | 0.640 ± 0.019 | 0.788 ± 0.017 | 0.320 ± 0.008 | 0.199 ± 0.010 | 950.3 |
| | XGBoost [$t_{term}$] | | | | | |
| 5 | 0.770 ± 0.009 | 0.657 ± 0.015 | 0.771 ± 0.014 | 0.326 ± 0.008 | 0.198 ± 0.006 | 662.3 |
| 10 | 0.778 ± 0.007 | 0.667 ± 0.017 | 0.769 ± 0.016 | 0.332 ± 0.009 | 0.195 ± 0.010 | 705.7 |
| 15 | 0.780 ± 0.008 | 0.669 ± 0.019 | 0.768 ± 0.018 | 0.333 ± 0.009 | 0.194 ± 0.011 | 806.0 |
| 20 | 0.781 ± 0.008 | 0.668 ± 0.019 | 0.771 ± 0.016 | 0.333 ± 0.009 | 0.194 ± 0.011 | 843.8 |
| 41 | 0.781 ± 0.008 | 0.668 ± 0.020 | 0.771 ± 0.017 | 0.333 ± 0.009 | 0.194 ± 0.011 | 977.9 |
| | AdaBoost [$t_{early}$] | | | | | |
| 5 | 0.732 ± 0.012 | 0.632 ± 0.016 | 0.730 ± 0.023 | 0.299 ± 0.008 | 0.248 ± 0.000 | 2010.5 |
| 10 | 0.765 ± 0.009 | 0.632 ± 0.014 | 0.793 ± 0.012 | 0.317 ± 0.007 | 0.247 ± 0.000 | 2977.3 |
| 15 | 0.768 ± 0.009 | 0.648 ± 0.018 | 0.776 ± 0.015 | 0.322 ± 0.008 | 0.247 ± 0.000 | 2480.3 |
| 20 | 0.769 ± 0.008 | 0.649 ± 0.021 | 0.777 ± 0.018 | 0.322 ± 0.009 | 0.247 ± 0.000 | 2685.6 |
| 36 | 0.769 ± 0.008 | 0.649 ± 0.021 | 0.777 ± 0.018 | 0.322 ± 0.009 | 0.247 ± 0.000 | 3583.5 |
| | AdaBoost [$t_{term}$] | | | | | |
| 5 | 0.734 ± 0.012 | 0.637 ± 0.017 | 0.727 ± 0.027 | 0.301 ± 0.008 | 0.248 ± 0.000 | 2943.7 |
| 10 | 0.776 ± 0.008 | 0.663 ± 0.016 | 0.773 ± 0.013 | 0.330 ± 0.009 | 0.247 ± 0.000 | 2131.7 |
| 15 | 0.778 ± 0.008 | 0.666 ± 0.018 | 0.771 ± 0.016 | 0.332 ± 0.009 | 0.247 ± 0.000 | 3951.7 |
| 20 | 0.779 ± 0.008 | 0.667 ± 0.024 | 0.771 ± 0.021 | 0.332 ± 0.011 | 0.247 ± 0.000 | 3115.4 |
| 41 | 0.779 ± 0.007 | 0.669 ± 0.024 | 0.769 ± 0.021 | 0.333 ± 0.011 | 0.247 ± 0.000 | 6072.9 |

FIG. 6

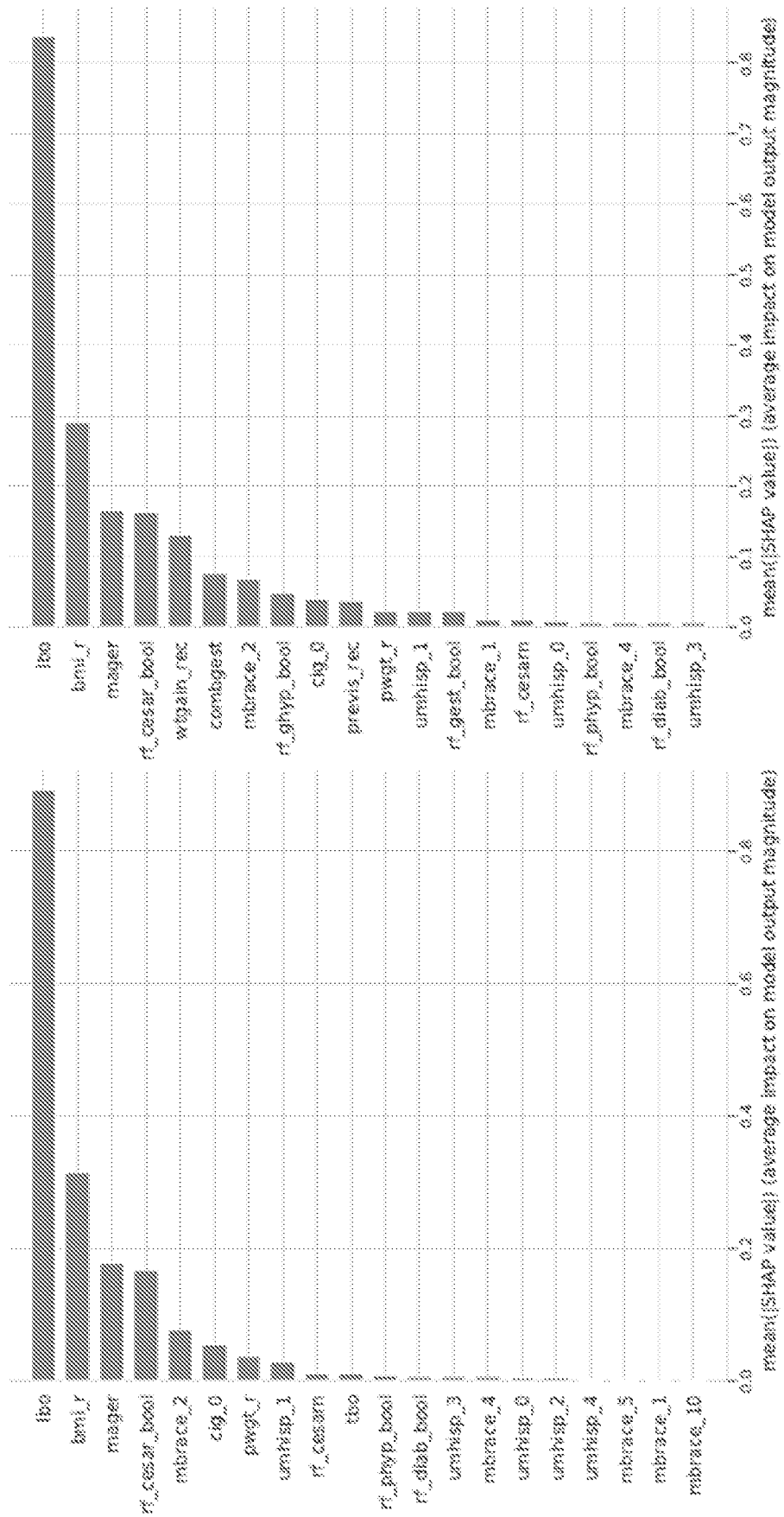
FIG. 7A $t_{early}$
FIG. 7B $t_{term}$

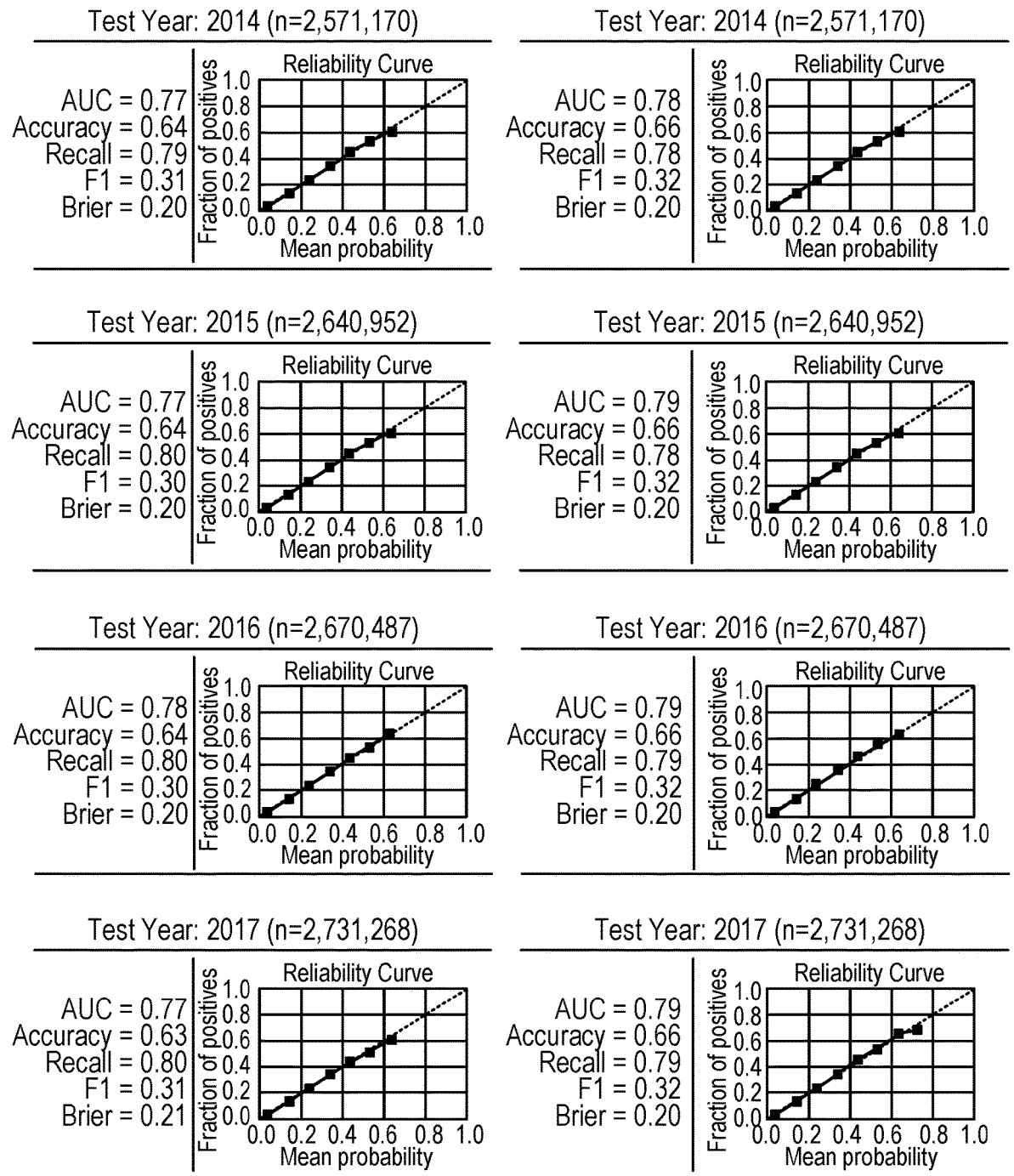
FIG. 8A $t_{early}$ – 15 feature parameters    FIG. 8B $t_{term}$ – 20 feature parameters

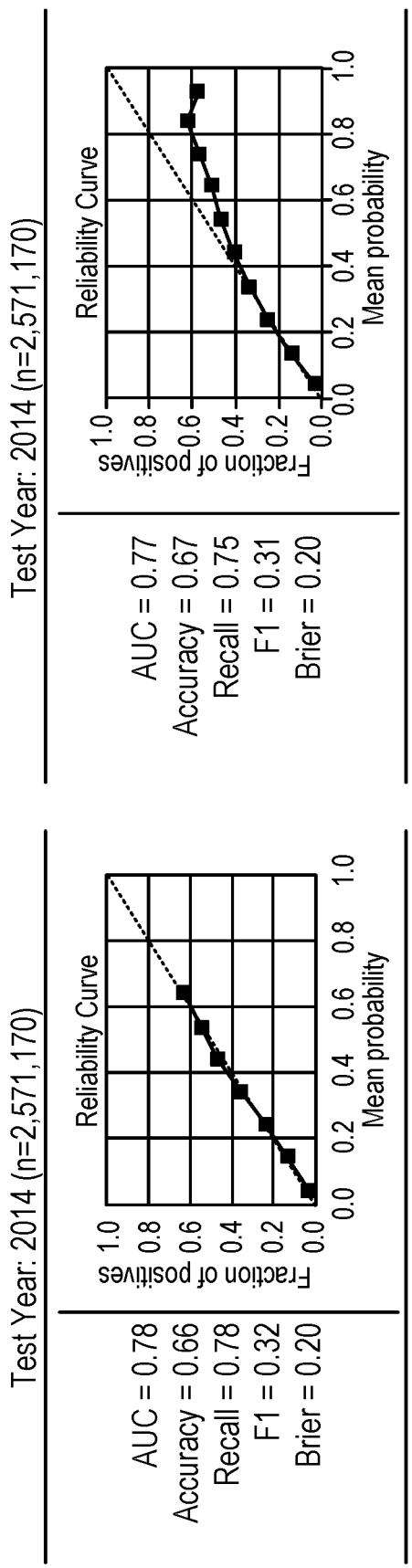
FIG. 9B  Logistic regression, $t_{term}$
FIG. 9A  Gradient-boosted trees, $t_{term}$

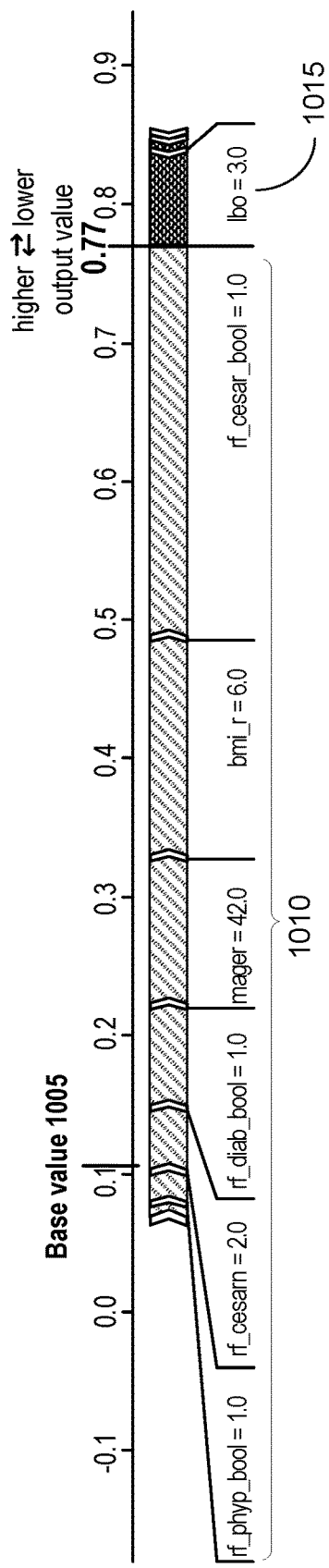
FIG. 10A high probability example
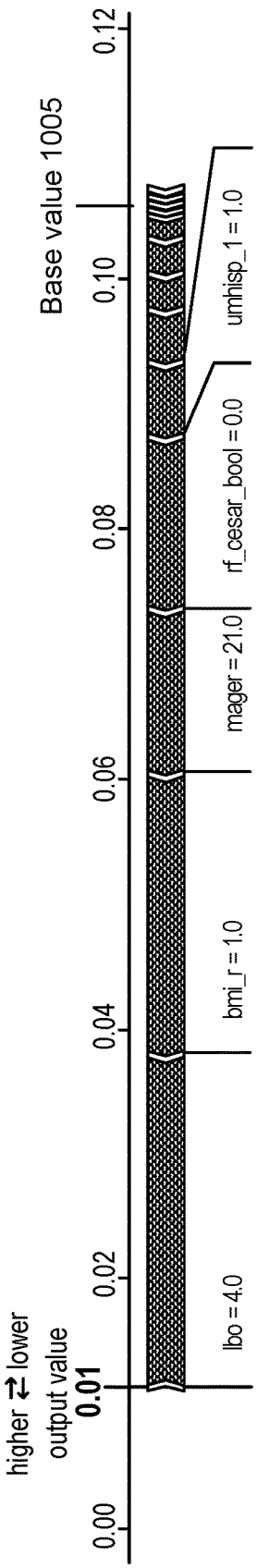
FIG. 10B low probability example
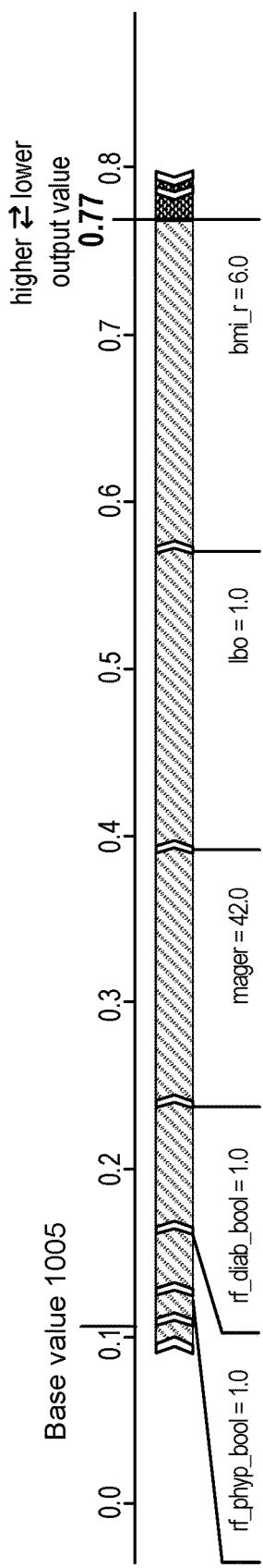
FIG. 10C high probability example with no prior C-section

Decision Pathways:

MATERNAL MORTALITY

| PREDICTION | INDIVIDUALIZED DECISION MAKING | RISK COMMUNICATION |

INDIVIDUAL OPTIMAL MODE OF DELIVERY

CROSS-REFERENCE TO RELATED APPLICATION

This application is a U.S. National Stage of PCT International Application No. PCT/US2021/058009 filed on Nov. 4, 2021, which claims the benefit of and priority to U.S. Provisional Application No. 63/110,217, filed on Nov. 5, 2020, and titled "INDIVIDUAL OPTIMAL MODE OF DELIVERY," the content of which are herein incorporated by reference in their entirety for all purposes.

BACKGROUND

Maternal and baby mortality and morbidity constitute one of the most significant health problems in healthcare worldwide today. The impact on the health outcomes, individual and societal impacts, and financial costs are staggering. The US ranks around 45th place among 200 countries of the world in most mortalities and morbidities, and is the only developed country with increasing maternal mortality rates. The cost of maternal and baby mortalities and morbidities are estimated in tens if not hundreds of billions of dollars a year in the US contributing to $3.6 trillion a year in healthcare spending (largest in the world), which corresponds to 17.7% of the GDP. In Texas, spending just for the neonatal intensive care exceeds $2 Billion a year.

Based on data from the Centers for Disease Control and Prevention (CDC), approximately 32% of all live births in the U.S. during the last decade have been performed via Cesarean section (C-section).[1] Of these C-sections, approximately 25% occur after an initial trial of labor is attempted for vaginal delivery. In total, these unplanned C-sections account for ~300,000 births each year. Unfortunately, unplanned C-sections are also associated with a two- to threefold increase in maternal morbidity and mortality rates along with poorer fetal outcomes,[2-7] as well as higher rates of neonatal intensive care admissions.

Accordingly, these unplanned C-sections are not only much riskier for both the mother and the baby when compared to vaginal delivery, but also when compared to an electively planned C-section before labor. An unplanned C-section in labor is associated with a two- to fivefold higher rate of perinatal mortality and morbidity versus an electively planned C-section. For those women who are at high risk of having an unplanned C-section in labor, a planned C-section before onset of labor is likely the much safer option. Additionally, the risks associated with the unplanned C-section increase with the duration and progress of labor. Thus, the risk of C-section later in the process of labor is higher than in the earlier stages.

A previously existing analytic model[27] to predict likelihood of a successful vaginal birth in use today is only applicable to those who have had a previous Cesarean delivery. Vaginal Birth After Cesarean (VBAC) calculator is a predictive tool to estimate the probability of vaginal delivery among women with a prior cesarean delivery, which constitute only ~15% of all pregnant women. Further, VBAC suffers from inaccuracies, which have discouraged the use of such predictive tools for clinical decisions in determining whether to plan a Cesarean delivery.

Therefore, it is desirable to develop a more accurate and more widely applicable prediction tools for use in planning Cesarean delivery.

BRIEF SUMMARY

Embodiments of the present disclosure may include a method including receiving, at a computer system, characteristic values of a pregnancy of a subject. As an example, the characteristic values can include a numerical value for a live birth order of the pregnancy for the subject. Embodiments may also include storing, in the computer system, a machine learning model that receives a first set of input features and provides a second set of one or more output values. In some embodiments, the first set of input features can correspond to the characteristic values of the pregnancy of the subject. In some embodiments, the second set of one or more output values can include a probability of a Cesarean delivery. Embodiments may also include inputting the characteristic values into the machine learning model to obtain the probability of the Cesarean delivery being required for the subject during an attempt of a vaginal delivery. Embodiments may also include performing the Cesarean delivery or avoiding one based on the probability. In this manner, the risks and costs of unplanned Cesarean deliveries can be reduced.

In some embodiments, the method may further comprise determining importance values for the first set of input features, and providing the importance value on a user interface of the computer system. The importance values can be provided to a mother and/or her provider of care for making the decision to pursue a planned Cesarean delivery or if risk is below a threshold pursuing a vaginal delivery.

In some embodiments, the probability of the Cesarean delivery can be used to determine a utility rate. For example, the probability and a mortality or morbidity rates for an unplanned Cesarean delivery can be combined to obtain a first utility rate. A second utility rate can be determined using a probability of the vaginal delivery and a mortality or morbidity rate for the vaginal delivery. The first utility rate and the second utility rate can be combined to obtain an overall utility rate for trial of vaginal delivery. In some implementations, the method can further comprise comparing the overall utility rate to a utility rate for a planned Cesarean delivery to determine a preferred safest mode of delivery.

These and other embodiments of the disclosure are described in detail below. For example, other embodiments are directed to systems, devices, and computer readable media associated with methods described herein.

A better understanding of the nature and advantages of embodiments of the present disclosure may be gained with reference to the following detailed description and the accompanying drawings.

BRIEF DESCRIPTION OF THE DRAWINGS

FIG. 2 shows example modeling parameters according to embodiments of the present disclosure.

FIGS. 5A and 5B show example parsing and filtering of raw data to identify training and testing cohorts according to embodiments of the present disclosure.

FIG. 6 presents comparative classification performance metrics from multiple ten-fold cross-validation procedures using the training set with three different machine-learning algorithms and varying number of input features from the $t_{early}$ and $t_{term}$ prediction scenarios.

FIGS. 7A and 7B shows the 20 most important features and their importance values for both the $t_{early}$ and $t_{term}$ scenarios.

FIGS. 8A and 8B present scoring results of the trained XGBoost models applied to the external validation test cohort on a per-year basis (four years in total) for both $t_{early}$ and $t_{term}$ scenarios.

FIGS. 9A and 9B show model calibration performance comparison for external validation data from 2014 for the $t_{term}$ prediction scenario for gradient-boosted trees model and logistic regression model.

FIGS. 10A-10C show user interfaces illustrating individualized parameter influences on the individual probability predictions of different features according to embodiments of the present disclosure.

DETAILED DESCRIPTION

Figure 1:
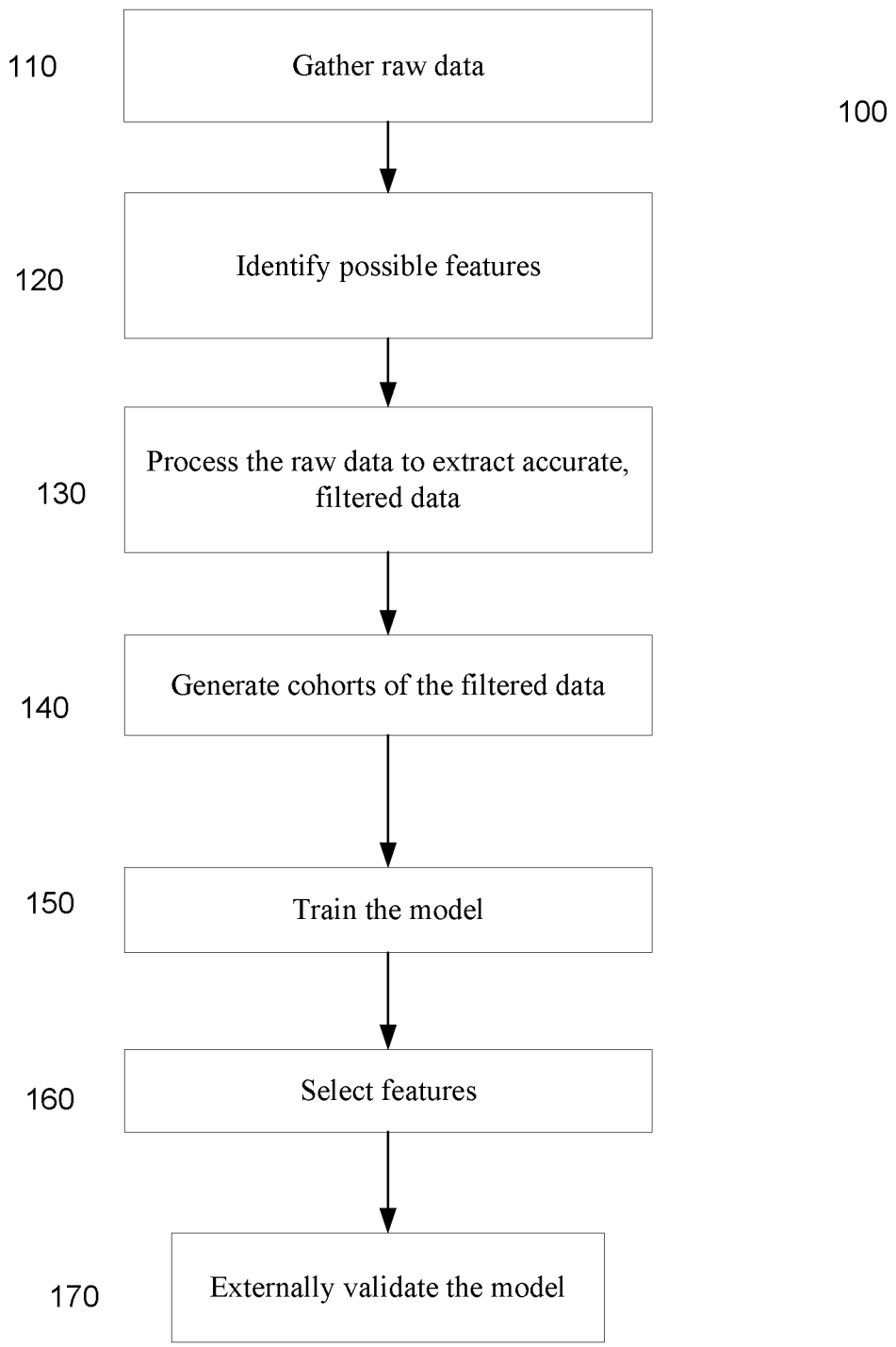
FIG. 1 shows a pipeline for generating a prediction model for use in determining whether to have a Cesarean delivery according to embodiments of the present disclosure.

In an effort to develop models aimed at improving health outcomes in labor and delivery, this disclosure can quantify the likelihood of an unplanned Cesarean section based on various (e.g., 15-22) maternal characteristics. Machine learning techniques are used to ascertain influential parameters, train and evaluate models, and assess accuracy against available test data. Implementations have considered all labored births during model development and testing and leveraged cohorts using CDC data for model development and model validation (with n≈6.5 M births for training and n≈10.6 M births for testing in the current work).

The machine learning models described herein can improve birth-related mortalities and morbidities, reduce costs of healthcare, and provide additional information for patients and caregivers. Potential parameters for the models can account for various prediction scenario timeframes. For example, one timeframe can occur at the beginning of a pregnancy, e.g. during the 1$^{st}$ trimester or even before pregnancy. Another timeframe can occur near the end of pregnancy, where important additional information is available. Maternal characteristics observed to have significant predictive influence on a successful vaginal delivery include age, live birth order, pre-pregnancy body mass index (BMI), prior C-sections, race/ethnicity, pre-pregnancy smoking, initial weight, and weight gain during pregnancy. Various implementations can include various combinations of the characteristics (features), e.g., as described herein. A determination of feature importance can be used to explain why certain maternal characteristics lead to a specific prediction for an individual patient, thereby allowing a pregnant female to make an informed decision. Accordingly, the developed machine-learning model provides a new support tool to aid in shared decision making efforts before and during labor.

As mentioned above, a feature importance analysis can be used to explain why certain maternal characteristics lead to a specific prediction in individual patients. Such additional quantitative information can aid in the decision process on whether to plan for a Cesarean section in advance, a substantially safer option among women at a high risk of unplanned Cesarean delivery during labor.

Further, an interactive graphical user interface (GUI) can be provided to communicate and integrate the model into a decision-making aid. In various embodiments, the software (including the GUI) can provide one or more of the following: (1) Individual probability of different modes of delivery (e.g., vaginal delivery, unplanned cesarean delivery, and elective-planned cesarean delivery), along with associated personal risks to the mother and the baby with these modes; (2) Individual risk factors and protective characteristics and their impact on the individual patient probability of different modes of delivery; (3) Interactive decision tree incorporating the individual probabilities of the modes of delivery and their individual associated risk of maternal and neonatal mortality and morbidity specific to the individual patient.

Excellent model calibration is observed in external validation results for entire target population (all births in the country) and for multiple years. The disclosed techniques are shown to reduce the rates of maternal and baby mortalities and morbidities and reduce the costs of health care by at least $0.5 Billion a year.

The decision of whether to have a Cesarean delivery can be made at various times during pregnancy, including during labor. Thus, the disclosed techniques can aid in the management of labor. Among patients attempting vaginal delivery, the risks associated with unplanned cesarean delivery to the mother and the baby increase with labor progress. Some embodiments can assist in making a decision of unplanned cesarean delivery earlier in labor or to extend the trial of a vaginal delivery if the risk of unplanned cesarean delivery is low and the chance of the safest vaginal delivery remains high. This decision making can be applied to upwards of four million pregnancies each year in the US.

I. Pipeline for Generating Prediction Model

FIG. 1 shows a pipeline 100 for generating a prediction model for use in determining whether to have a Cesarean delivery according to embodiments of the present disclosure. The pipeline can involve (110) gathering raw data to generate training and validation datasets, (120) identifying possible features, (130) processing the raw data to extract accurate, filtered data for the training and validation datasets, (140) generating cohorts of the filtered data, (150) training the model, (160) feature selection, and (170) performing validation to determine performance metrics. Various blocks can be performed in a different order. Pipeline 100 can be implemented using one or more computers.

A. Dataset

At block 110 of FIG. 1, raw data is gathered. The raw data can be gathered in various ways and from various sources. For example, the data considered for this analysis is published by the CDC on an annual basis and provides vital statistics information for all U.S. births. Forms can characterize labor and the method of delivery, including a flag indicating whether labor was attempted or not (recorded in CDC published data as ME TRIAL). Combined with the method of delivery information, embodiments can classify C-sections into labored or non-labored variants for which the labored variant is assumed to be an unplanned C-section. Reporting of such data started in 2005 (30.7% of the births had the data reported); by 2011, this percentage had increased significantly to over 85% and surpassed 95% beginning in 2014. Based on this observed reporting trend and a motivation to include the majority of births in a given year for our analysis, results in this disclosure use births reported between 2011-2017.

The raw data can include various data items (e.g., characteristics) for the mother, father, and fetus. The raw data can be collected at various times, e.g., values taken before pregnancy, during pregnancy ($1^{st}$, $2^{nd}$, or $3^{rd}$ trimester), and during labor. During labor, the data can be obtained from a variety of different measurement devices, which can measure or be used to measure properties of the labor, such as baby's heartbeat, presenting part station (also referred to as fetal station), and cervical dilation. The presenting part is the part of the baby that leads the way through the birth canal. The raw data can include static characteristics that are permanent (e.g., race of the mother) and dynamic characteristics that can change, e.g., the BMI of the mother.

For this work, a custom Python data-analysis pipeline was developed and executed to train, finalize, and validate the prediction model for delivery. In one implementation, the raw data is first loaded on a year by year basis into arrays[9] (e.g., in the software Pandas) being careful to account for revised birth certificate reporting flags[10] and variable relocations that occur at periodic yearly boundaries. In total, we were able to assemble a large aggregate dataset from 2011-2017 consisting of over 25 million births that were reported using the revised birth certificate format.

B. Potential Features and Processing of Raw Data

At block 120 of FIG. 1, possible features are identified. The features are to be input into the machine learning model. Such features can be input individually (e.g., each feature as a separate input) or as aggregated features (e.g., some features can be combined to make a new aggregate feature, as can be done by concatenation). Which features may be selected can depend on the data items (also referred to as data elements) obtained in the raw data. A variety of data elements for the mother, father, and baby can be included in the raw birth data, e.g. as described herein. The feature values can be considered as a feature vector that is input to the machine learning model.

FIG. 2 shows example modeling parameters according to embodiments of the present disclosure. FIG. 2 shows maternal characteristics that are grouped into two broad sets based on their time of availability: the $t_{early}$ prediction scenario includes items known during the 1st trimester while the $t_{term}$ scenario includes additional items known at or near the time of labor and delivery. FIG. 2 also shows the type of data in the feature, namely numerical, binary, or categorical. A binary type just has Yes or No (or any other binary classification, such as True/False or 0/1). A numerical type can be integers or floating point numbers, e.g., including decimals up to a specified resolution. A categorical type can provide a selection from a list of options, ordered or unordered, e.g., as may be provided on a form.

At block 130 of FIG. 1, the raw data is processed to extract accurate, filtered data. The processing can include changing how the data is stored, e.g., changing text values to binary values. As another example, the categorical variables (mbrace: mothers bridged race; umhisp: Hispanic origin) can have various values, each of which can be considered a separate feature. The categorical variables can be one-hot encoded,[11] which can increase the modeling state space to 41 parameters. The different categories can be denoted using different number values, e.g., as shown in later figures. The six binary features in FIG. 2 can generated by converting textual risk factors parsed from the raw data to their binary counterparts.

One subtlety of note that arose during the data parsing concerns the consistent availability and definition of mother's bridged race during the reporting years 2011-2017. In particular, the allowable values for the mbrace variable reduced significantly in 2014 to include only four race identifier values versus the 18 identifiers defined previously from 2011-2013. Fortunately, additional race recode variables were also introduced in 2014 and we identified one new variant (mrace15) with sufficient overlap with the original variable. The race identification values for this new variable are identical to the previous mbrace values with the exception of how bridged multiple races are identified. With mrace15, a single categorization is used to identify multiple race values while the original mbrace variable delineated a mother's bridged race into four variants. To derive a consistent race designation for all analysis years considered herein, the bridged multiple race options present in years 2011-2014 were collapsed into a single marker in combination with the use of mrace15 for later years.

Overall, the number of different possible feature values (i.e., permutations of the different feature values) is very high. Such a high number of different permutations can enable specific modeling of behavior between different pregnancies, thereby enabling more accurate classification of risk for vaginal birth and for an unplanned C-section for a particular pregnancy.

Figure 3:
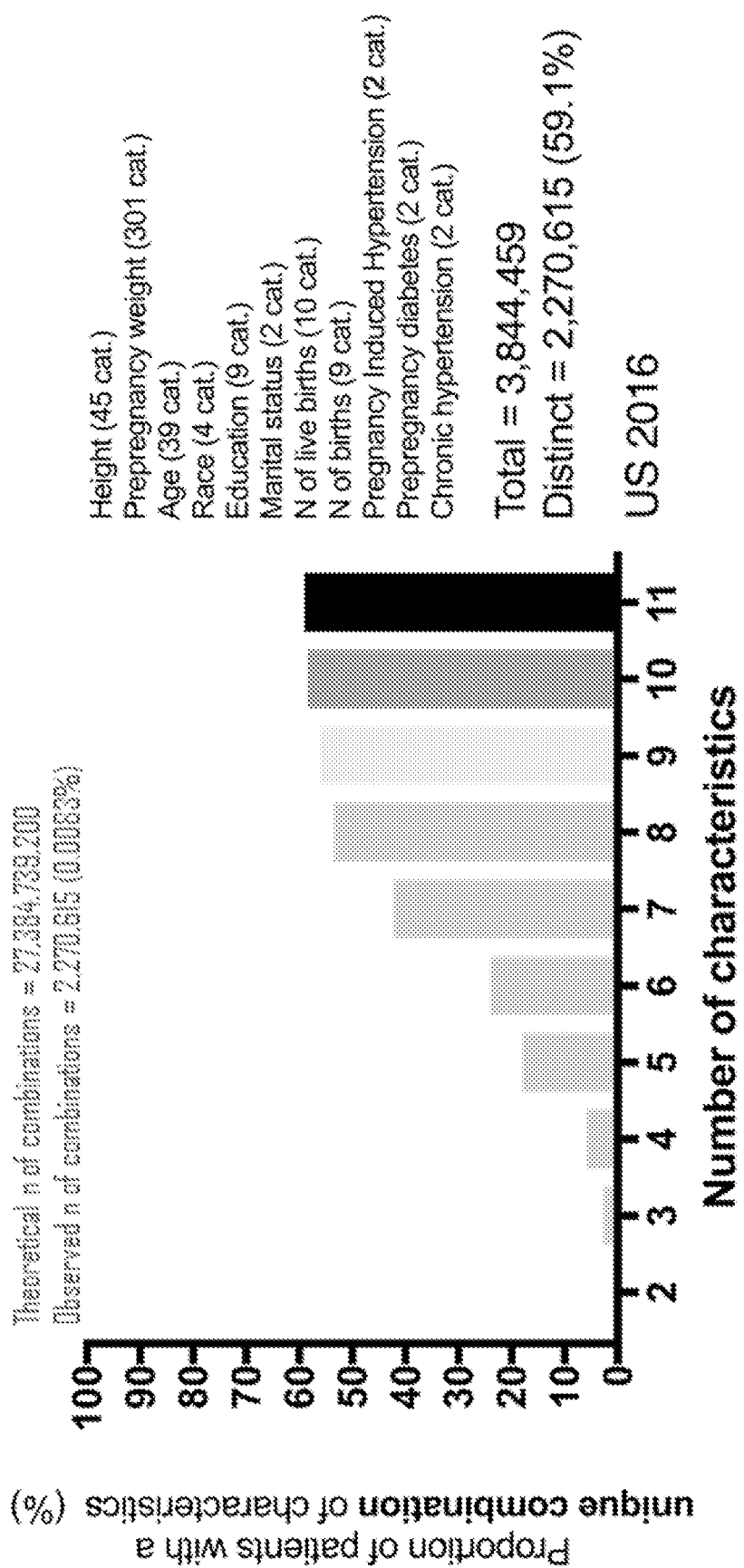
FIG. 3 shows the number of unique combinations of different features values that occurred for birthers in 2016.

FIG. 3 shows the number of unique combinations of different features values that occurred for births in 2016. The number of different values is listed for each of 11 features, with pregnancy weight having the highest number of different values (301). As shown, 2,270,615 different combinations were observed, among 3,844,459 women who gave birth that year in the US, allowing highly individualized risk prediction and counselling. As more features (characteristics) are used, the higher percentage of patients had a unique combination of feature values. With 11 characteristics, about 60% of the patients had a unique combination.

Further filtering can be applied to restrict analysis to singleton births with labor attempted and cephalic (head) presentations. The non-cephalic presentations in labor are delivered by C-section as a standard of care, contribute a very small percentage of births, and do not require a decision about mode of delivery. Births in which modeling variables from FIG. 2 are missing may also be dropped from the analysis.

C. Cohorts

At block 140 of FIG. 1, cohorts of births are determined from the filtered data. The cohorts can include a training cohort and a testing cohort (e.g., for external validation). Each cohort can include classifications of vaginal births and unplanned C-sections (also referred to as labored C-sections).

Figure 4:
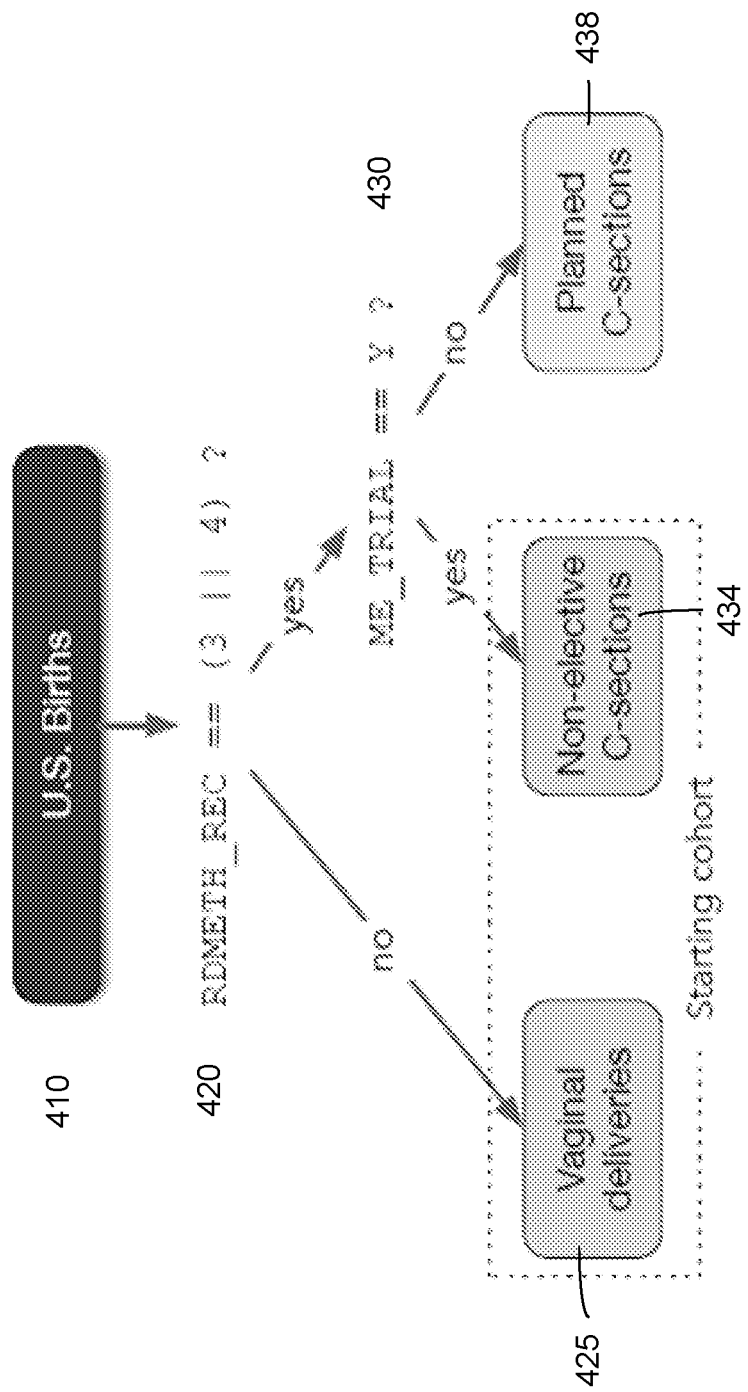
FIG. 4 is a flowchart showing the parsing of the raw data to identify different classifications of births to form a cohort according to embodiments of the present disclosure.

FIG. 4 is a flowchart showing the parsing of the raw data to identify different classifications of births to form a cohort according to embodiments of the present disclosure. Once the relevant raw data has been parsed and loaded, a starting analysis cohort can be assembled using the logic identified in FIG. 4.

At block 410, the raw data for records of births are loaded. The data records can be stored in a database with each record including a set of fields corresponding to the measured characteristics. The data can be loaded into the records in a variety of ways, e.g., manually or using natural language processing to parse the data on the forms and load into the corresponding field. As another example, the data can be also extracted from corresponding fields in electronic medical records.

At block 420, a particular field (e.g., RDMETH_REC equals 3 or 4) is parsed to detect whether a particular value(s) exists. If the particular value does not exist, the birth was determined to be a vaginal delivery 425. If the particular value does exist, then the flow proceeds to block 430.

At block 430, a different field is parsed to detect whether labor was attempted. A YES is classified as a non-elective C-section 434. A NO result is classified as a planned C-section 438. The cohort uses the vaginal deliveries 425 and the non-elective C-sections 434, as the prediction model is used to determine the risk of whether a non-elective C-section will be needed. The cohort of planned C-section 438 is not needed.

FIGS. 5A and 5B show example parsing and filtering of raw data to identify training and testing cohorts according to embodiments of the present disclosure. In FIG. 5A, the training cohort is generated using births from 2011-2013. In FIG. 5B, the testing cohort is generated using births from 2014-2017.

FIG. 5A shows a summary of the multi-step data filtering process taken to assemble the training cohort comprised of 6,530,467 births. Various filtering steps are shown, such as excluding births that do not have the revised birth certificate, excluding births where it is unknown whether labor was tried, and excluding planned C-sections (i.e., not trial of labor). Birth records with missing data can be excluded, e.g., status of whether previous C-section is unknown, as well as other data such as those shown. Non-Singleton births were excluded, as well as breach births (non-cephalic presentations). The number of births excluded by each filter is provided in parentheses.

Of the ~6.5 million births that attempted labor, 10.7% of them (700, 943) ultimately delivered via unplanned C-section and these form the positive class for evaluation of the various supervised machine-learning configurations. The negative class correspond to the vaginal births (5,829,524).

FIG. 5B shows the corresponding data filtering process to arrive at the test cohort, which indicates a cohort consisting of 10,613,877 births. A slightly smaller percentage of unplanned C-sections are present in the test cohort (10.1%). These cohorts are used to provide the results below.

In various embodiments, the number of samples in the training cohort can include at least 10,000, 20,000, 50,000, 100,000, 200,000, 500,000, 1,000,000, 2,000,000, 10,000,000, or more patients. In various embodiments, the number of samples in the testing cohort can include at least 10,000, 20,000, 50,000, 100,000, 200,000, 500,000, 1,000,000, 2,000,000, 10,000,000, or more patients.

D. Training

At block 150 of FIG. 1, the machine learning model is trained. For example, the input training samples from FIG. 5A can be used. The known output labels are the classifications of whether a vaginal birth was performed or a labored (unplanned) C-section. Various combinations of input features from the total of possible features can be used.

The machine learning model was trained using supervised learning to predict the mode of delivery, which can be defined as a binary output class that corresponds to whether a child was delivered vaginally (class=0) or via an unplanned C-section (class=1). Other embodiments can have more classifications and/or probabilities for each classification.

Various machine learning models can be used, such as support vector machines, logistic regression, neural networks, and decision trees. Additionally, ensemble techniques (such as boosting or bagging) can use multiple model types or multiple models of a same type. Boosting can reduce bias and variance, and can convert weak learners to strong ones, e.g., increasing accuracy. Example boosting techniques include gradient boosting and adaptive boosting (Adaboost). Additionally, bagging algorithms can be used, such as random forest. Various solvers can be used for the training to determine the optimized solution. Example solvers include gradient techniques, such as gradient descent, stochastic average gradient, or backpropagation, as well as other techniques of higher order such as conjugate gradient, Newton, quasi-Newton, or Levenberg-Marquardt.

To test applicability of classification techniques, three example algorithms were trained and evaluated via cross-validation using the training cohort. The first classifier uses regularized logistic regression[12] with a stochastic average gradient solver.[13] The second classifier uses an optimized gradient-boosted tree variant, XGBoost.[14] The third classifier considered is AdaBoost,[11] a meta-estimator which combines weighted predictions from a sequence of weak learners. All example classifiers used the scikit-learn[16] interface for training, cross-validation, scoring evaluation, and prediction.

The distribution for the output class was unbalanced with 10.3% of the data samples observed in the positive class in the raw data from 2011-2017. The output class is unbalanced because the proportion in the two classes is not 50% each. The proportion of patients in the positive class in the training data can be used as a Bayesian prior probability for determining the predicted probability. Given the imbalance present in our unplanned C-section classification variable, additional care was taken to appropriately weight samples during the training phase. One implementation leveraged scikit's compute_sample_weight function to compute individual sample weights that are inversely proportional to class frequency. These weights are then provided as input to each of the underlying classifiers fit( ) method. We chose this approach over undersampling[17] to avoid ignoring the majority of births available during training. The weights can act as a penalization that imposes a higher penalty for getting a classification of unplanned C-section wrong than getting a vaginal birth wrong.

The machine learning models can be of various complexity. For example, a decision tree can include at least 20, 30, 40, 50, 60, 70, 80, 90, 100, 150, 200, or 500 nodes. A model can include at least 1, 2, 3, 4, 5, 6, 7, 8, 9, 10, 15, 20, 50, 100, 150, 200, 300, 400, 500, or 1,000 decision trees. Other models (e.g., a neural network) can use a similar number of nodes. In various embodiments, a model can include at least 50, 100, 200, 300, 400, 500, 1000, 2000, 5000, or 10000 parameters. Further, various numbers of input features may be used, e.g., at least 5, 6, 7, 8, 9, 10, 11, 12, 13, 14, 15, and 20.

E. Feature Selection

At block 160, the features are selected for the model to be used in production for classifying new pregnancies. The features can be selected based on which features provide the most accurate model. Various techniques can be used to determine the accuracy or importance of features. For supervised learning, such techniques can include wrapper, filter, and intrinsic techniques. The wrapper techniques can use different subsets of features to generate different models and compare accuracy in training. The filter techniques can analyze feature importance, e.g., which feature had a largest separation between the two possible output classifications. Intrinsic techniques can perform automatic feature selection. A filter technique is described below.

Feature selection results were evaluated in the context of cross-validation using the training set, and classification performance was computed for multiple subfeature counts (i.e., different subsets of features) for both $t_{early}$ and $t_{term}$ scenarios. To choose the subset of features, each of the three machine-learning algorithms considered were first trained against the entire training set with all available parameters. Then, feature importance for each parameter was computed in one of two ways depending on the classifier. For XGBoost, the feature order was determined using mean SHAP value[18] impacts on model output. For the other two classifiers, the feature importance method was exploited in scikit-learn which orders model parameters using gini importance.[19] Subsets of the most important features were then used in ten-fold cross-validation to assess model performance with increased feature counts for each algorithm. Note that the parallel (threaded) capability of XGBoost was exploited on 44 cores to reduce execution time. The other classifiers do not have a parallel implementation within scikit-learn and were executed serially.

F. Validation

At block 170, one or more scoring metrics can be used for validation of a model The validation can determination that the one or more scoring metrics satisfy one or more validation criteria (e.g., lower or greater than a threshold, depending on how the metric is defined). Two models can be compared using the scoring metrics, e.g., to determine which model is more accurate for the goals of the model. An overall score can be determined when there are multiple metrics, e.g., whichever has the most metrics lower than the other mode. As another example, the overall score can be a weighted sum or other function of the metrics, and the model with the lowest overall score can be selected.

To perform the validation, the input testing samples from FIG. 5B can be used. The known output labels are the classifications of whether a vaginal birth occurred or a labored (unplanned) C-section was performed.

In various implementations, five scoring metrics were computed against yearly subsets of the test cohort using standard classification scoring routines provided by the sklearn.metrics class. The scoring metrics include AUC (area under the ROC curve), accuracy, recall, Brier loss, and F1, Additionally, reliability (model calibration) curves can be generated by computing histograms of predicted model probabilities into bins (e.g., 10 bins) and comparing the mean probability within each bin to the fraction of true positives from samples within the bin.[12] As described in the next section, the model probabilities for the samples (e.g., for the testing cohort) within the same bin have similar values, and thus they are grouped into the same bin. Note that while the maximum bin count considered is ten, we restricted the highest bin to have a minimum of at least 100 samples. As shown later, the reliability curves can show that the predicted probability of a birth requiring an unplanned C-section corresponds to the actually observed percentage of births requiring an unplanned C-section. In this manner, the mother can reliably know the associated risks.

When evaluating model calibration curves, some embodiments can perform additional treatment to adjust resulting classifier probability outputs to account for the imbalanced prevalence of unplanned C-sections. For example, a similar prior distribution between training and test populations can be assumed, e.g., 10.7% unplanned C-section and 89.3% vaginal births. Some implementations can use the imbalance ratio observed from the training cohort $$\left(\beta = \frac{700,943}{5,829,524} = 12 \cdot 0.2\%\right)$$

to adjust raw classifier probabilities (p) to a calibrated probability (p') as follows:

$$p' = \frac{\beta p}{\beta p - p + 1}.$$

The adjusted probability p' can provide a more accurate measure for the actual probability that an unplanned C-section would occur.

II. Results

Based on cross-validation results from a large training cohort (n=6,530,467 births), the gradient-boosted tree algorithm was identified as the best performer and was evaluated on a large test cohort (n=10,613,877 births) for two prediction scenarios during pregnancy. Area under the receiver operating characteristic curves of 0.77 or higher and recall scores of 0.78 or higher were obtained and the resulting models are very well calibrated. Furthermore, the resulting gradient-boosted tree model outperforms traditional logistic regression in terms of model calibration.

A. Comparative Performance of Features

The cross-validation results for each classifier and feature count (set of features) were used to identify the best model configuration for the $t_{early}$ and $t_{term}$ scenarios. The final two model configurations were then used to complete a validation study using the test cohort consisting of births from later years during 2014-2017.

FIG. 6 presents comparative classification performance metrics from multiple ten-fold cross-validation procedures using the training set with three different machine-learning algorithms and varying number of input features from the $t_{early}$ and $t_{term}$ prediction scenarios. The number of input features is shown in the first column as "Params." The first set of results, which use between 5-36 features selected from the $t_{early}$ set of features (See FIG. 2), are for logistic regression. The five scoring metrics mentioned above are shown. Execution runtimes obtained on a commodity server are also included.

The next set of results are also for logistic regression using features selected from the $t_{term}$ set of features, which is inclusive of the $t_{early}$ set of features. Similar data is provided for XGBoost and AdaBoost. Scoring results are fairly comparable across all the classifiers, although AdaBoost and XGBoost perform slightly better with AUC scores of 76% or better and recall scores of 77% or higher (when using a minimum of 10 feature parameters). Furthermore, XGBoost is seen to deliver better (lower) Brier scores in all cases.

Based on the cross-validation results from the training cohort, the gradient-boosted trees algorithm of XGBoost was chosen as the best model candidate and was evaluated using a large external validation test cohort comprised of births reported by the CDC during 2014-2017. Guided by the classification performance of the XGBoost cross-validation results in the training dataset, which considered four subsets of modeling parameters based on feature importance selection, the following modeling configurations were chosen for evaluation: 15 parameters from $t_{early}$ and 20 parameters from the $t_{term}$ modeling scenario. These feature counts were chosen as the minimum number of parameters for which a steady state in scoring metric performance was generally observed.

In the analysis to select the features, a maximum of 41 parameters were considered after one-hot encoding categorical variables for the $t_{term}$ prediction scenario (36 parameters for the $t_{early}$ scenario). For the gradient-boosted trees method, we computed values to analyze feature importance based on the average impact on model output for the top 20 parameters presented.

FIGS. 7A and 7B shows the 20 most important features from the XGBoost model as identified via computation of SHapley Additive exPlanations (SHAP) values[18] for both the $t_{early}$ and $t_{term}$ scenarios. In both cases, the top four most influential parameters are seen to be the live birth order (lbo), pre-pregnancy body mass index (bmi_r), mother's age (mager), and prior C-section indicator (rf_cesar_bool). In the $t_{term}$ case, the weight gain during pregnancy (wtgain_rec) is also seen to be influential as the $5^{th}$ most important feature. Of particular note, the VBAC calculator does not use live birth order, while FIGS. 7A and 7B show live birth order to have the highest importance value.

In addition to live/total birth order and number of previous C-sections, other variables from the $t_{early}$ scenario making the top 10 most influential features include mbrace_2 (indicating race=Black), cig_0 (pre-pregnancy smoking), pwgt_r (pre-pregnancy weight), and umhisp 1 (indicating a Mexican hispanic origin). The one-hot encoding results in different variables that are Boolean about whether a subject is of a particular race and a particular Hispanic origin. Three additional parameters available near the end of pregnancy are seen to be in the top 10 for average model impact in the $t_{term}$ prediction scenario, namely wtgain_rec (weight gain), combgest (gestational age), and previs rec (number of prenatal visits). In various implementations, the gestational age can be determined using either or a combination of ultrasound and last menstrual period dating depending on discrepancy between the two.

Various embodiments can use various subsets of features. For example, some implementations can use the top 3, 4, 5, 6, 7, 8, 9, 10, 11, 12, 13, 14, 15, 16, 17, 18, 19, or 20 features of FIG. 7A or FIG. 7B. In other implementations, one or more of the top features can be omitted, but the rest of the top features can be used. For example, the top 1, 3, and 4 features may be used from FIG. 7A or FIG. 7B. As another example, the top 1, 2, 3, and 5 features may be used from FIG. 7A or FIG. 7B. Other examples for FIG. 7A or 7B include the top: 2, 3, 4, and 5; 1, 2, 4, 5, and 6; 1, 2, 3, 4, and 6, and so on.

A combination of predictors with the most impact in the individual patient prediction can be entirely different from the average importance in the model mentioned above. A predictive feature can be impactful on average among a population of patients e.g. lbo or bmi, but not affecting risk in a particular patient whose risk maybe driven by one or more of typically less impactful factors, e.g. diabetes, hypertension, etc. This mechanism underlies individualization and thus more accurate prediction as opposed to using presence of the most impactful on average features.

B. Accuracy

FIGS. 8A and 8B present scoring results of the trained XGBoost models applied to the external validation test cohort on a per-year basis (four years in total) for both $t_{early}$ and $t_{term}$ scenarios. In addition to computing raw metrics of AUC, accuracy, recall, F1, and Brier scores, model reliability curves are presented for each year. Results are seen to be very consistent from year to year, and the reliability curves indicate good model calibration (the dashed line shown in each reliability curve provides a reference for a perfectly calibrated model). In particular, the reliability curves show agreement between predicted probability (e.g., pregnancies with a 30-40% risk of C-section) occurring with that same proportion in the external validation data. Note that raw classifier probabilities are adjusted based on the imbalance ratio using Eqn (1), which does result in a cap of maximum calibrated probabilities. Consequently, the largest mean probability seen in the reliability curves is 78%.

Cross-validation results obtained from the best of three different machine-learning classification algorithms considered herein showed AUC and recall scores of 77% and 79% respectively for the $t_{early}$ prediction scenario using 15 modeling parameters. Similar results for the $t_{term}$ prediction scenario were observed with AUC and recall scores of 78% and 77% respectively with 20 modeling parameters employed. Exercising the XGBoost model trained against births from 2011-2013 across multiple external validation years from the test cohort yielded classification scores that were nearly identical to the training data, and were also very consistent year to year from 2014-2017. After accounting for classification imbalance, the resulting gradient-boosted tree models are also seen to have excellent calibration properties when evaluated against the external validation test cohort. Good calibration performance is an important requirement for any potential clinical model as it reflects the degree to which a model's predicted probability estimates the true observed frequency.[28]

Given the low accuracy of VBAC calculator, it was very surprising to see the high accuracy that was obtainable for births that occurred without a previous C-section, as well as the accuracy for births that did occur after a C-section. In particular, the reliability curves matched the actual proportion in the population, so clinical decisions can be accurately made.

C. Comparative Performance of Models

Given the popularity of logistic regression classifiers and scoring results from the ten-fold cross-validation analysis shown in FIG. 6, we also tested a trained logistic regression model on one year of external validation data from 2014. The same feature count was used as the trained XGBoost model.

FIGS. 9A and 9B show model calibration performance comparison for validation data from 2014 for the $t_{term}$ prediction scenario for gradient-boosted trees model and logistic regression model. A strong difference can be seen in the calibration performance. While the discrimination scoring metrics are fairly comparable between the two models, the calibration performance of the gradient-boosted trees method is substantially better than logistic regression, particularly for higher probability values.

III. Interpretation for Individuals

To aid in interpretation of the trained models and decision making (e.g., XGBoost) for individual predictions, embodiments can provide information about the influence of a particular feature (parameter) on the probability that an unplanned C-section will be required.

FIGS. 10A-10C show user interfaces illustrating individualized parameter influences on the individual probability predictions of different features according to embodiments of the present disclosure. In particular, the parameter influences are determined using the force plot utility provided by the SHAP library[22] for several test cohort samples for the $t_{early}$ scenario. The graphs show features that increase the probability from a base value 1005 and features that decrease the probability from the base value 1005 for a given subject.

FIG. 10A presents the highest probability sample (p=77%) for an unplanned C-section. The six most influential parameter values 1010 are shown that push the probability of an unplanned C-section for this birth to be significantly higher than the mean probability value of all predictions, which was p=10.6%, corresponding to the base value 1005. One parameter 1015 is shown to decrease the risk probability of an unplanned C-section. The definitions of the features can be found in FIG. 2.

In addition to this mother having had multiple prior C-sections, a high body mass index (BMI≥40), pre-pregnancy diabetes, and hypertension contributed to a high-probability prediction. Note that the recorded bmi_r values correspond to six different BMI ranges delineated as follows:

1) underweight (<18.5)
2) normal (18·5-24·9)
3) overweight (25.0-29.9)
4) obesity I (30.0-34.9)
5) obesity II (35.0-39.9)
6) extreme obesity III (≥40)

FIG. 10B shows the lowest probability sample (p=1.2%). FIG. 10B highlights the five most influential parameter values that lowered the probability prediction of an unplanned C-section significantly below the mean. Multiple births without a prior C-section, low body mass index (BMI≤18.5), and a young age are seen to lower this mother's likelihood of an unplanned C-section.

FIG. 10C shows a high probability of an unplanned C-section in a mother who has not had a previous C-section. Clinically, the occurrence of one or more previous C-sections has been the main determinant reducing likelihood of vaginal delivery.[23] In this case, a high body mass index, pre-pregnancy hypertension, and diabetes again contribute to a higher unplanned C-section probability (p=77%), as well as the mother's age and live birth order.

Such importance values can convey to a mother the reasons for the high risk of an unplanned C-section. Such information can be critical for the mother planning a C-section. Further, if such features can be changed (e.g., BMI or weight gain during pregnancy), a mother can change behavior to reduce the risk of the unplanned C-section to an extent that a vaginal birth is chosen, given the lowered risk probability. Having the specific risk for a given feature can enable a mother to identify a specific amount of risk and provide motivation for changing a modifiable feature.

The user interface can include various inputs to provide the information about the mother. For example, slider bars can be used to provide age, number of previous C-sections, live birth order, total birth order (e.g., including fetuses that were stillborn—born not alive after 20 weeks 0 days of pregnancy), and daily number of cigarettes smoked, as well as height and pre-pregnancy weight, which can be used to determine a BMI. Race and ethnicity can be entered from a list of buttons. Binary values (e.g., for pre-pregnancy diabetes and pre-pregnancy hypertension) can be selected in a variety of ways, e.g., with a toggle button or slider.

Figure 11A:
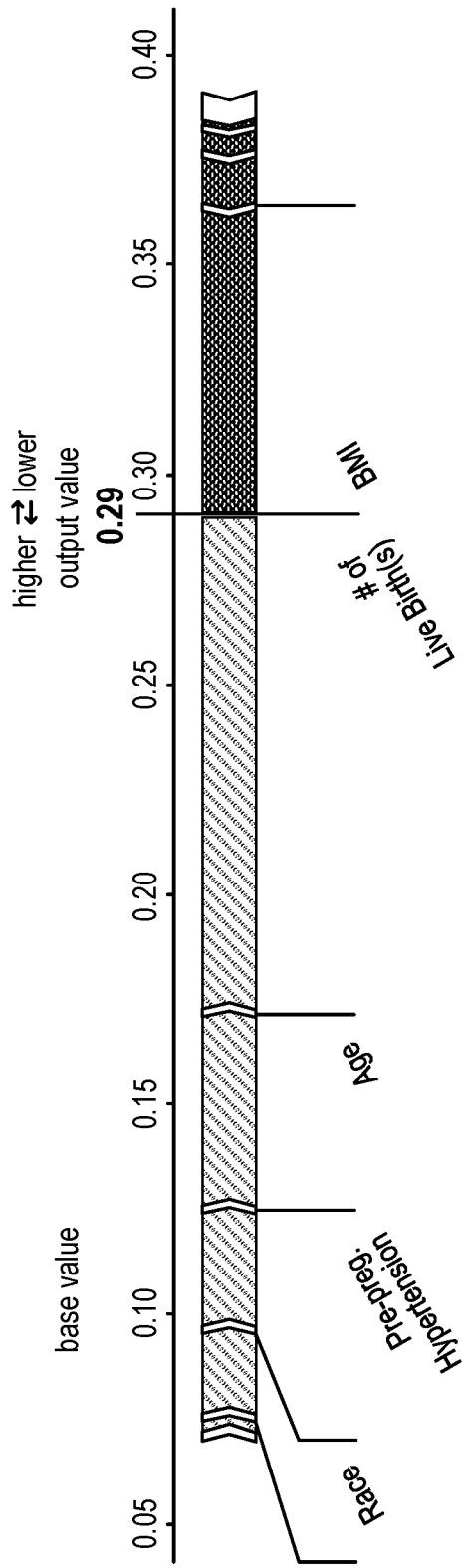
FIG. 11A shows the importance values for a mother with a probability of ~29% for an unplanned C-section.
Figure 11B:
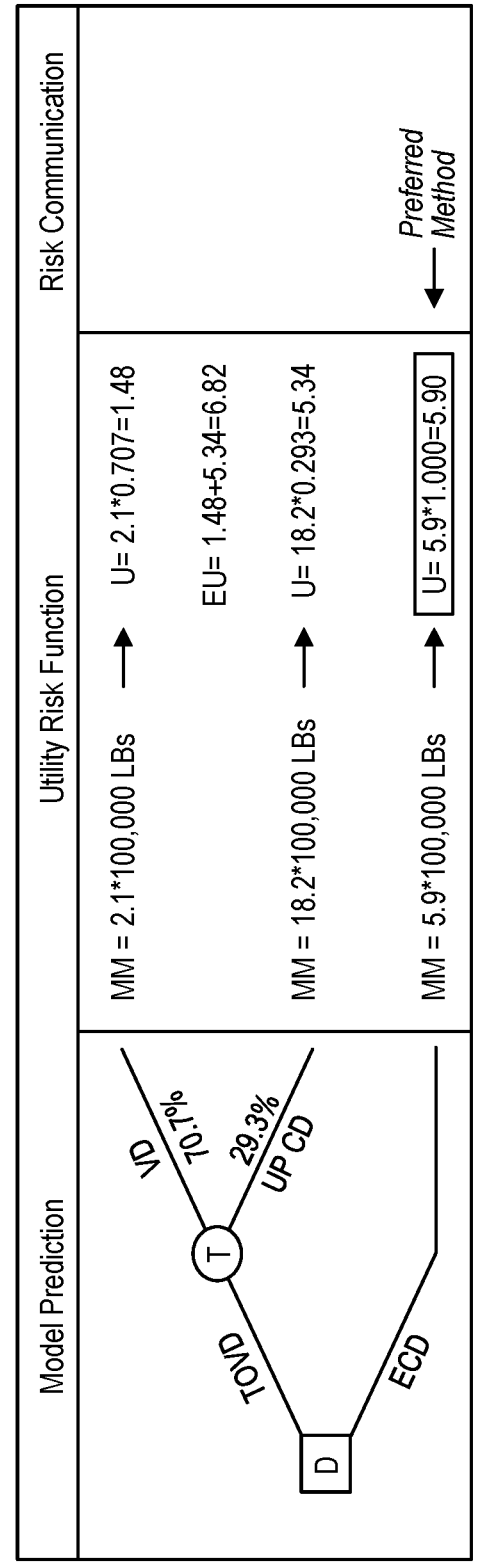
FIG. 11B shows an individual decision pathway for the mother from FIG. 11A.

FIG. 11A shows the importance values for a mother with a probability of ~29% for an unplanned C-section. FIG. 11B shows an individual decision pathway for the mother from FIG. 11A. Both FIGS. 11A and 11B can be provided on a single page of a user interface or on separate pages.

The decision pathway in FIG. 11B shows an initial delivery option of D, with decision options of trial of vaginal delivery (TOVD) and planned or elective Cesarean delivery (ECD). The TOVD option extents to a decision point T, with a branch of unplanned Cesarean delivery (UP CD) having a probability of 29.3% and a branch of vaginal delivery of 70.7%. The utility risk function combines the probability for different outcomes with the mother or baby's mortality or morbidity rate. For example, the probability of an unplanned C-section is 29.3% (0.293) and the average mother mortality for unplanned C-section is 18.2 per 100,000 live births, which provides a utility (probability of unplanned C-section and associated mortality) of 5.34 of morbidity. In contrast, the utility for a vaginal delivery is 70.7% (0.707) with a mortality of 2.1 per 100,000, which provides a utility of 1.48. Thus, the overall expected utility of the mortality rate for trying a vaginal delivery while accounting for the risk of an unplanned C-section is 1.48+5.34=6.82. For a planned C-section, the expected utility of maternal mortality is 5.9, which is lower than the overall expected utility risk for an attempted vaginal birth. Thus, the elective C-section is the preferred safer method of delivery.

Figure 12A:
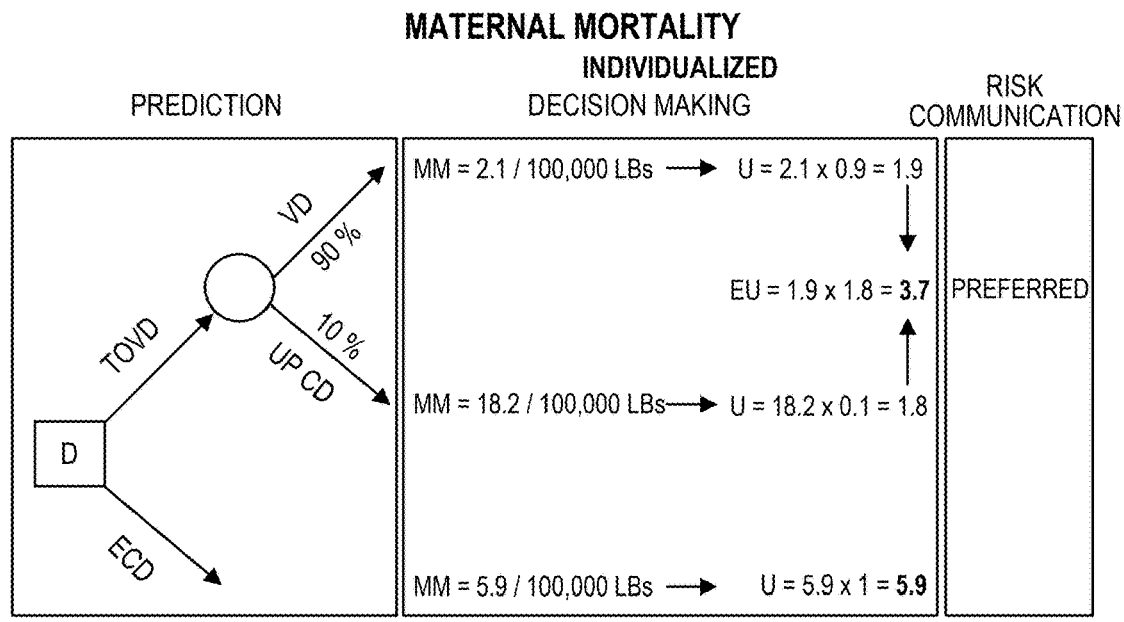
FIGS. 12A-12C provide further examples of user interfaces for individualized decision making according to embodiments of the present disclosure.
Figure 12B:
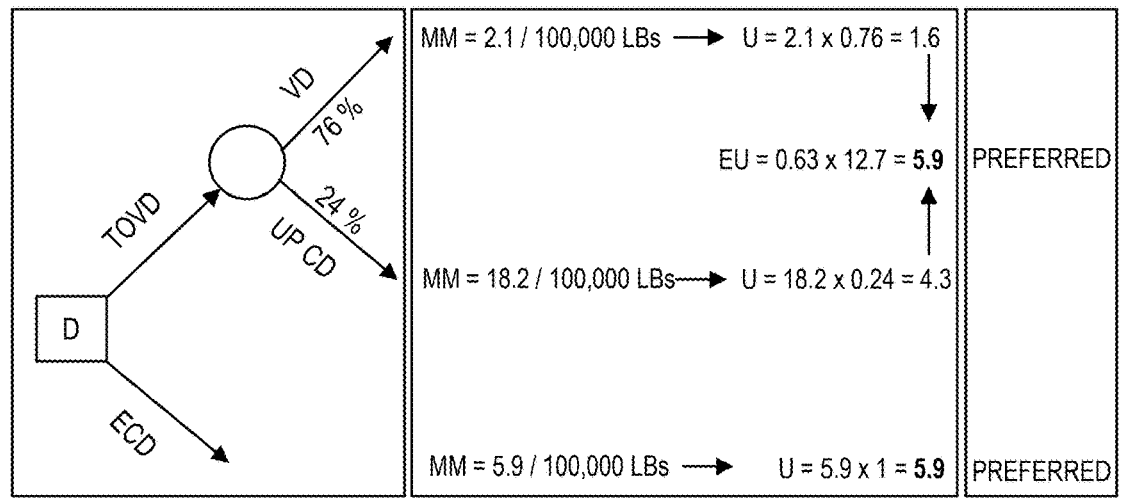
Figure 12C:
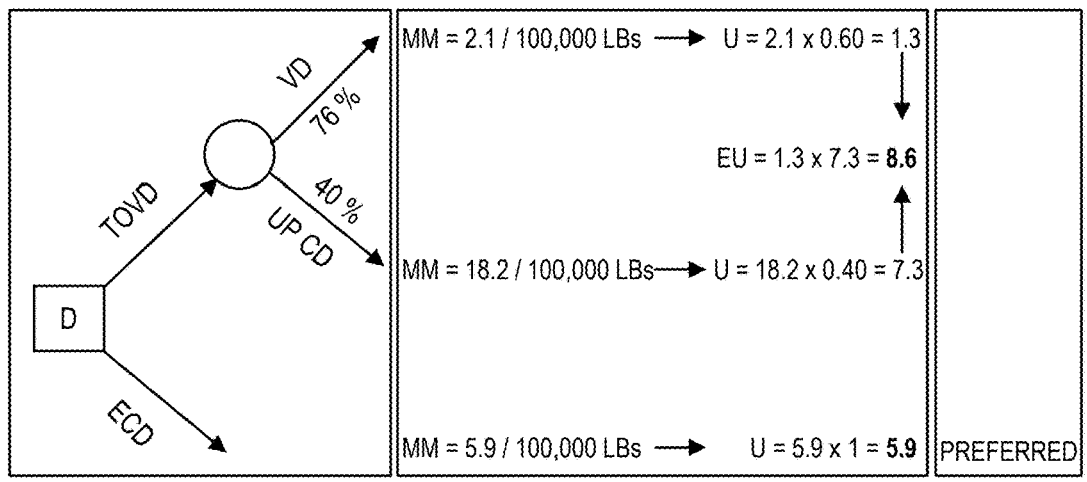

FIGS. 12A-12C provide further examples of user interfaces for individualized decision making according to embodiments of the present disclosure. In FIG. 12A, the mother has a 10% chance of unplanned C-section, resulting in an overall expected utility of mortality of 3.7, which is less than the corresponding rate for a planned C-section. Thus, an attempt for a vaginal birth is the preferred safer option.

In FIG. 12B, the mother has a 24% chance of unplanned C-section, resulting in an expected utility of 5.9, which is equal to the expected utility rate for a planned C-section. Thus, either option is preferred. In FIG. 12C, the mother has a 40% chance of unplanned C-section, resulting in an expected utility of mortality of 8.6, which is less than the expected utility of mortality for a planned C-section. Thus, an attempt for a vaginal birth is preferred and safer.

Such information has the practical effect of enabling a mother and a physician to proceed with the option that reduces overall harm to patients and reduces costs. Additionally, a mother can change for example the BMI to decrease the probability of risk. Further details on the advantages are provided in a later section.

IV. Use During Labor

In addition to determining a delivery option before labor starts, embodiments can also be used to make decisions during labor. For example, new information obtained during labor can be entered by a medical person, extracted from electronic medical records, or automatically provided by a medical instrument. Such new information can be used in the model to provide any updates to probabilities, rates, or scores, as well as notifications (e.g., audio, visual, or texts) when any of the probabilities, rates, or scores reaches a threshold or changes, e.g., such that a C-section is now more probable and provides the lower mortality and morbidity rates. The notification (alert) can be a push notification or provided in response to a user request. In response to such a notification, a medical professional can initiate procedures for a C-section.

The further in labor that a C-section is attempted, the more dangerous the C-section is. Thus, embodiments can also be useful in determining to perform a C-section earlier in labor. The individual risk of the unplanned C-section can help a doctor determine when to perform a C-section during labor. In other embodiments, the model can use measurements obtained during labor, e.g., the progress of labor (dilatation and station) and fetal heart rate tracing; the abnormalities of both are the two main indications for performance of unplanned C-section. For example, a heart rate monitor can be communicably coupled with one or more processors on which embodiments of the model are installed, e.g., as software. Such measurements can be fed into the model at a periodic rate, and the model can determine new updated values (probabilities, rates, or scores) with each set of new measurements.

Accordingly, the Cesarean delivery can be performed after attempting the vaginal delivery. Properties of the pregnancy can be measured during a trial of labor to obtain one or more measured properties. The characteristic values of the pregnancy of the subject can include the one or more measured properties. The one or more measured properties can include one or more vital signs of a fetus, e.g., heartbeat of the fetus. As another example, the one or more measured properties include a progress of labor (e.g., cervical dilation and/or station of the fetus).

V. Method

As described above, embodiments can use characteristic values of a pregnancy, e.g., as shown in FIG. 2. A model can be trained (e.g., as described in section ID) to use the characteristic values of a pregnancy to provide information about risks, probabilities, rates, and scores that may be used in making medical decisions, e.g., what type of delivery is to be performed. Once the model is trained, the model can be used for a new individual to determine the type of delivery. For example, the utility rate in FIGS. 11B and 12A-12C can be provided and used to make the delivery decision. Other information, such as certain characteristic values contributing the most to risk, can also be provided, as well as other information described herein.

Figure 13:
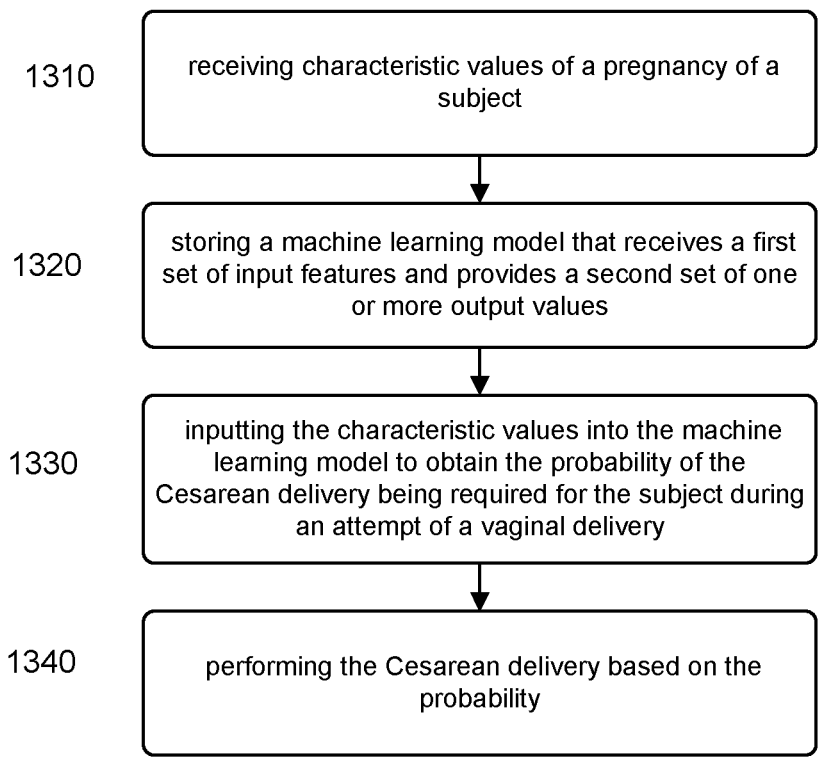
FIG. 13 shows an exemplary method 1300 according to some embodiments of the present disclosure.

FIG. 13 shows an exemplary method 1300 according to some embodiments of the present disclosure. According to FIG. 13, embodiments may include a method including blocks 1310 to 1340. One or more blocks of method 1300 can be performed by a computer. Method 1300 can use a machine learning model that has been previously trained, e.g., as described herein, to determine the probability of a Cesarean delivery being required. Method 1300 may be performed at any time during a pregnancy, including during labor. Embodiments can also be used prior to a pregnancy.

At block 1310, a computer system receives characteristic values of a pregnancy of a subject. Example characteristics values are shown in FIG. 2 and described herein. Such characteristics values can be determined at various stages of pregnancy and may be updated to provide a new result when the new values are obtained. Some or all of the characteristic values may be received from memory (e.g., RAM, a hard drive, an optical drive, flash memory, etc.), may be entered by a person, or received from another instrument (e.g., as measured by a medical instrument).

As an example, the characteristic values can include a numerical value for a live birth order of the pregnancy for the subject. Various numbers characteristic values can be used, e.g., as described herein. For example, the characteristic values can include at least 5, 10, 15, and 20 characteristic values. FIGS. 7A and 7B show examples of the characteristic values ranked by importance. The subject may not have had a previous Cesarean delivery.

At block 1320, the computer system stores a machine learning model that receives a first set of input features and provides a second set of one or more output values. The first set of input features can correspond to the characteristic values of the pregnancy of the subject, and the second set of one or more output values can include a probability of a Cesarean delivery, e.g., as described herein. The first set of input features can correspond to the characteristic values by being the characteristic values or by being derived from the characteristic values. For example, certain characteristic values can be combined into a single feature (e.g., concatenated). As another example, a function can be applied to a characteristic value before being used.

The machine learning model can be trained using the first set of input features, e.g., as described herein. All or some (a subset) of a global set of characteristic values can be used for the training, and thus all or some may be used in method 1300, which uses the trained machine learning model. A global set can refer to all characteristic values that are available.

The one or more output values can be used by later modules for providing information, notifications, or other results. For example, an output value can include the probability of the Cesarean delivery being required, and this output value can be provided to a utility module that determines a utility rate, e.g., as described herein. This utility rate may be a final value that is provided to a user of the computer system. In some implementations, a user can configure the computer system to provide a desired final result or set of results. Such a configuration can determine which modules to use in addition to the machine learning model.

At block 1330, the characteristic values are input into the machine learning model to obtain the probability of the Cesarean delivery being required for the subject during an attempt of a vaginal delivery. The machine learning model can operate on the first set of input features that correspond to the characteristic values. A pre-processing module of the machine learning model can transform the characteristic values into the first set of input features, e.g., by concatenation or other functions, as is described herein. The machine learning model can operate using parameters that were optimized during the training process. The probability of the Cesarean delivery being required can be obtained and provided to another module or output on an output device (e.g., a display screen or speakers). Accordingly, the probability can be provided via a user interface.

At block 1340, the method may include performing the Cesarean delivery based on the probability. The Cesarean delivery can be performed with or without attempting the vaginal delivery. For example, as described in section IV, the decision can be made based on measurements during labor. As other options or in other implementations, the probability can be used in determining to allow spontaneous onset of labor or performing induction of labor if the risk of unplanned cesarean section is low. The probability can also be used to select patients with low risk of unplanned cesarean delivery for birth in a birthing center, rather than in the hospital if patient so desires. Thus, a location of a birth can be selected based on the probability.

The Cesarean delivery may be performed based on the probability via other values that are determined using the probability of the Cesarean delivery being required. For example, the decision to perform the Cesarean delivery can be made based on a utility rate, which is determined using the probability of the Cesarean delivery, as is described herein. The utility rate can be determined using one or more other individual probabilities, such as the probabilities of complications (e.g., morbidities and mortalities) associated with unplanned c section and with vaginal delivery. Accordingly, the Cesarean delivery can be performed based on an associated utility rate that accounts for an individual risk using the individualized probability of the Cesarean delivery.

As an example for using a utility rate, embodiments can combine the probability of the Cesarean delivery and a mortality or morbidity rate for an unplanned Cesarean delivery to obtain a first utility rate. The mortality or morbidity rate can be a general rate for all pregnancies, or a rate based on another model, given any one or more characteristics of the mother, fetus, or pregnancy. A second utility rate can be determined using a probability of the vaginal delivery and a mortality or morbidity rate for the vaginal delivery. The first utility rate and the second utility rate can be combined to obtain an overall utility rate of going into labor, e.g., as described for FIGS. 11B and 12A-12C. A user interface can provide the overall utility rate accounting for an individual risk of mortality and morbidity to the subject and the baby. The overall utility rate can be compared to an expected utility rate for a planned Cesarean delivery to determine a preferred mode of delivery.

The decision to perform the Cesarean can be determined based on other information, e.g., the importance of certain characteristic values to the probability in the model. Accordingly, embodiments can determine importance values for the first set of input features and provide the importance value on a user interface of the computer system, e.g., as in FIGS. 10A-10C and 11A.

When the Cesarean delivery is performed after attempting the vaginal delivery, the method can comprise measuring properties of the pregnancy during a trial of labor to obtain one or more measured properties. The decision to perform the Cesarean delivery can be made based upon updated results from the machine learning model, e.g., an updated probability or utility rate. In such a situation, the characteristic values of the pregnancy of the subject would include the one or more measured properties. As an example, the one or more measured properties can include one or more vital signs of a fetus. As another example, the one or more measured properties can include measures of progress of labor, such as a cervical dilation and presenting part station.

Methods can also include training of the machine learning model, e.g., as described herein. For example, a method can include receiving training data including the first set of input features for training samples to which an output label is known. The output label can include the vaginal delivery or the Cesarean delivery. The training data can be filtered as described herein. The training data can then be used to train the machine learning model.

As part of the training, a proportion of the training samples having the output label of the Cesarean delivery can be determined. As described herein, such a proportion is less than 50%, e.g., ~10%. Based on the proportion, a first group of training samples having the output label of the Cesarean delivery can be weighted higher than a second group of training samples having the output label of the vaginal delivery.

In some implementations, the machine learning model can include at least 15 input features. In one implementation, the at least 15 input features can include an age of the subject, a body mass index of the subject, whether a previous Cesarean delivery occurred for the subject, a race, ethnicity and/or national origin of the subject, a usage of tobacco by the subject, and a pre-pregnancy weight of the subject, pre-pregnancy diabetes, and pre-pregnancy hypertension. In another implementation, the at least 15 input features include at least one characteristic of the pregnancy obtain during the third trimester or near delivery, the at least 15 input features including a body mass index of the subject, an age of the subject, whether a previous Cesarean delivery occurred for the subject, a weight gain of the subject during the pregnancy, a gestational age, a race, ethnicity and/or national origin of the subject, a gestational hypertension status, a usage of tobacco by the subject, a number of prenatal visits, a pre-pregnancy weight of the subject, and a gestational hypertension and gestational diabetes status, gestational age at delivery.

VI. Advantages

Based on the results above, embodiments can predict with accuracy the risks of attempting a vaginal birth so that the option with the best safest outcome (optimal mode of delivery) can be selected. Accordingly, an individualized predictive model can be provided for optimal mode of delivery creating a clinically useful aid in decision making regarding the safest mode of delivery. For other countries besides the U.S., different models can use local data to make local decisions in those countries.

Example advantages of embodiment of the present disclosure include good calibration, clinical usefulness, high degree of individualization, and integration of risk of mortalities and morbidities for the mother and the child.

For calibration, there is good agreement between the predicted and observed probabilities of outcome. The external validation among population that was not involved in the development of the model is excellent. The excellent calibration is critical and allows use the model in clinical practice for decision making.

The clinical usefulness of prediction is predicated on availability of intervention, which could be applied based on the results of prediction. Without such an intervention the prediction models are not clinically useful. Some embodiments can allow for administering elective cesarean delivery in women who have a high risk of unplanned cesarean delivery and in whom elective cesarean delivery is a safer option than attempting labor as it would be associated with high probability of unplanned cesarean delivery and high associated risks.

The predictive model can allow accounting for millions of unique combinations of risk factors and protective characteristics in different patients and thus individualization of prediction and decision making. Such an individualization was possible to achieve by applying entire population of millions of deliveries and millions of individual unique combinations.

Embodiments can integrate the prediction of individual probabilities of different modes of delivery with individual thresholds based on individual risk of mortalities and morbidities to the mother and the baby into individual best decision making.

Figure 14A:
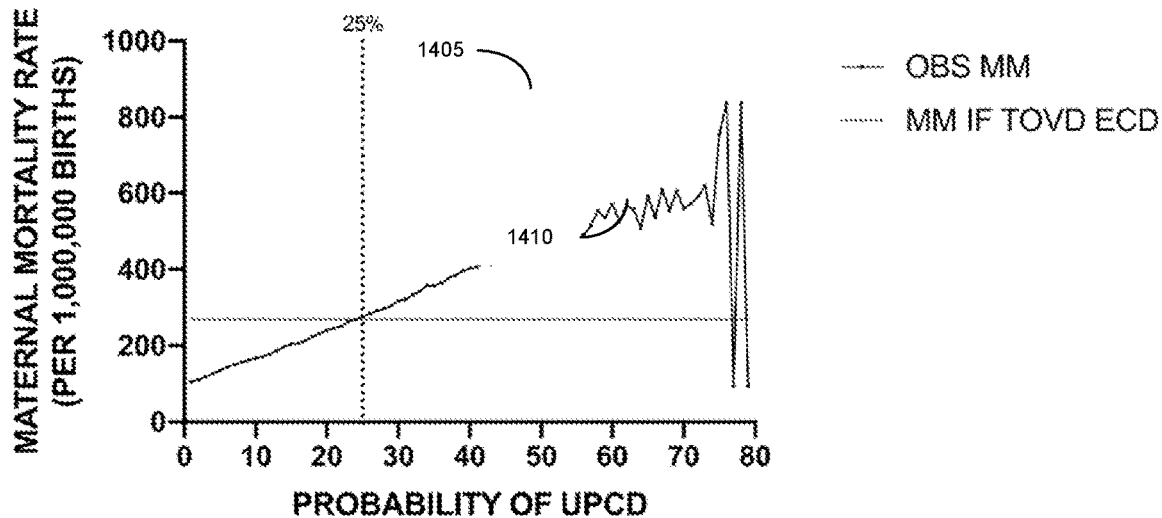
FIGS. 14A and 14B provide data illustrating the improvement in maternal and fetal outcomes for a probability of unplanned C-section according to embodiments of the present disclosure.
Figure 14B:
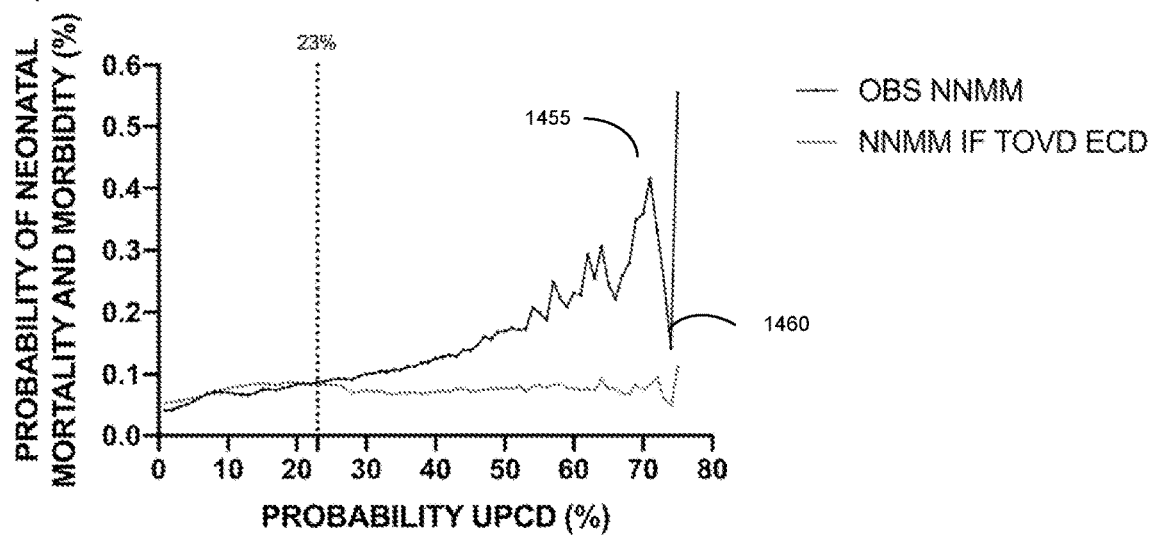

FIGS. 14A and 14B provide data illustrating the improvement in maternal and fetal outcomes for a probability of unplanned C-section according to embodiments of the present disclosure. The horizontal axis is the probability of unplanned C-section. For the maternal mortality (FIG. 14A), the mortality rate 1405 for an attempted vaginal birth is higher on average compared than the mortality rate 1410 for a planned C-section above a probability of 25%. For the neonatal mortality and morbidity (FIG. 14B), the neonatal mortality and morbidity rate 1455 for an attempted vaginal birth is higher on average compared than the neonatal mortality and morbidity rate 1460 for a planned C-section above a probability of 23%. This illustrates the improved outcomes that can be achieved by performing planned C-section for mothers that have a high probability of unplanned C-section.

Additionally, costs associated with births can be reduced. For example, nursing costs can be reduced by approximately $100,000,000-$300,000,000. For instance, the number of nursing labor hours for a planned C-section is around 2 hours vs. 20-25 hours for an unplanned C-section. Further, a reduction of neonatal intensive care admissions can save about $340,000,000.

Figure 15A:
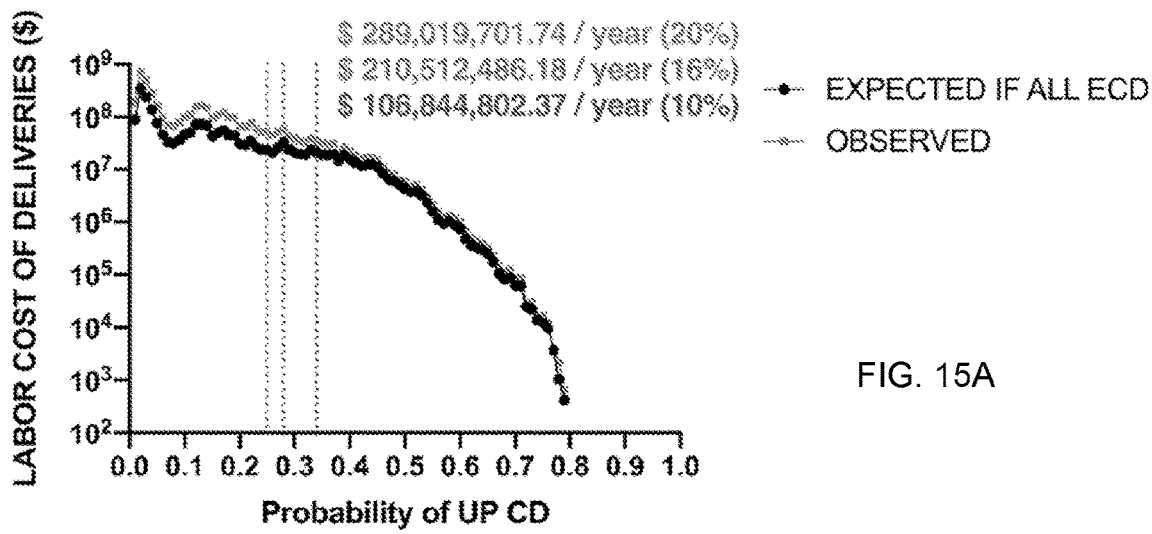
FIGS. 15A-15B provide graphs of costs savings due to reduction in the costs of nursing labor and neonatal intensive care admissions for a probability of unplanned C-section according to embodiments of the present disclosure.
Figure 15B:
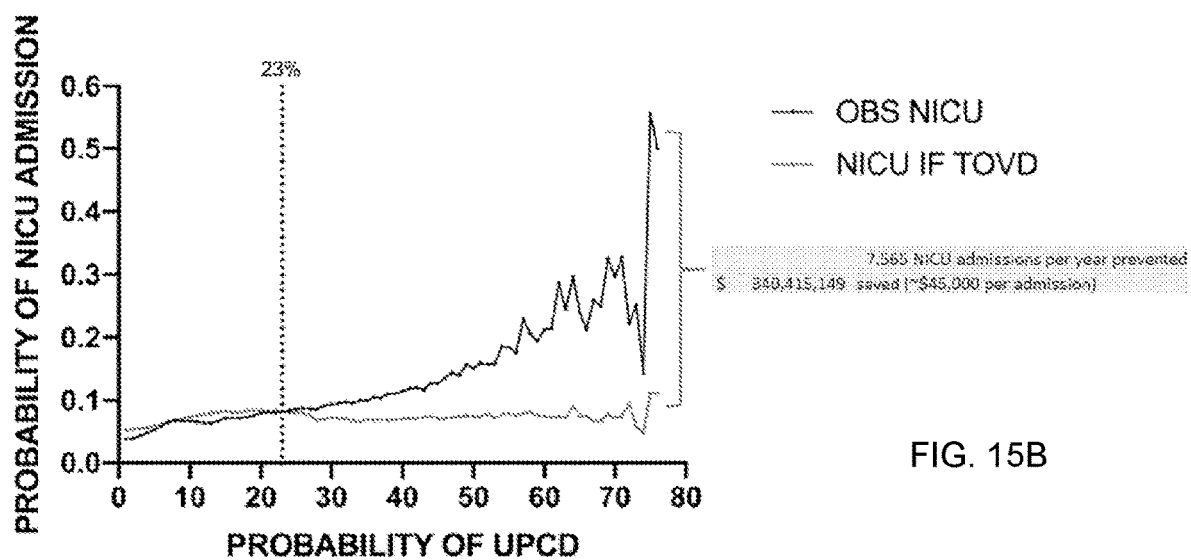

FIGS. 15A-15B provide graphs of costs savings due to reduction in the costs of nursing labor and neonatal intensive care admissions for a probability of unplanned C-section according to embodiments of the present disclosure. FIG. 15A shows the reduction in nursing labor costs if planned C-sections are performed for different probabilities of unplanned C-section and corresponding proportions of all births. FIG. 15B shows that neonatal intensive care unit (NICU) admissions can be reduced for births above a 23% probability for an unplanned C-section and corresponding reduction in costs associated with those prevented admissions.

VII. Computer System

Figure 16:
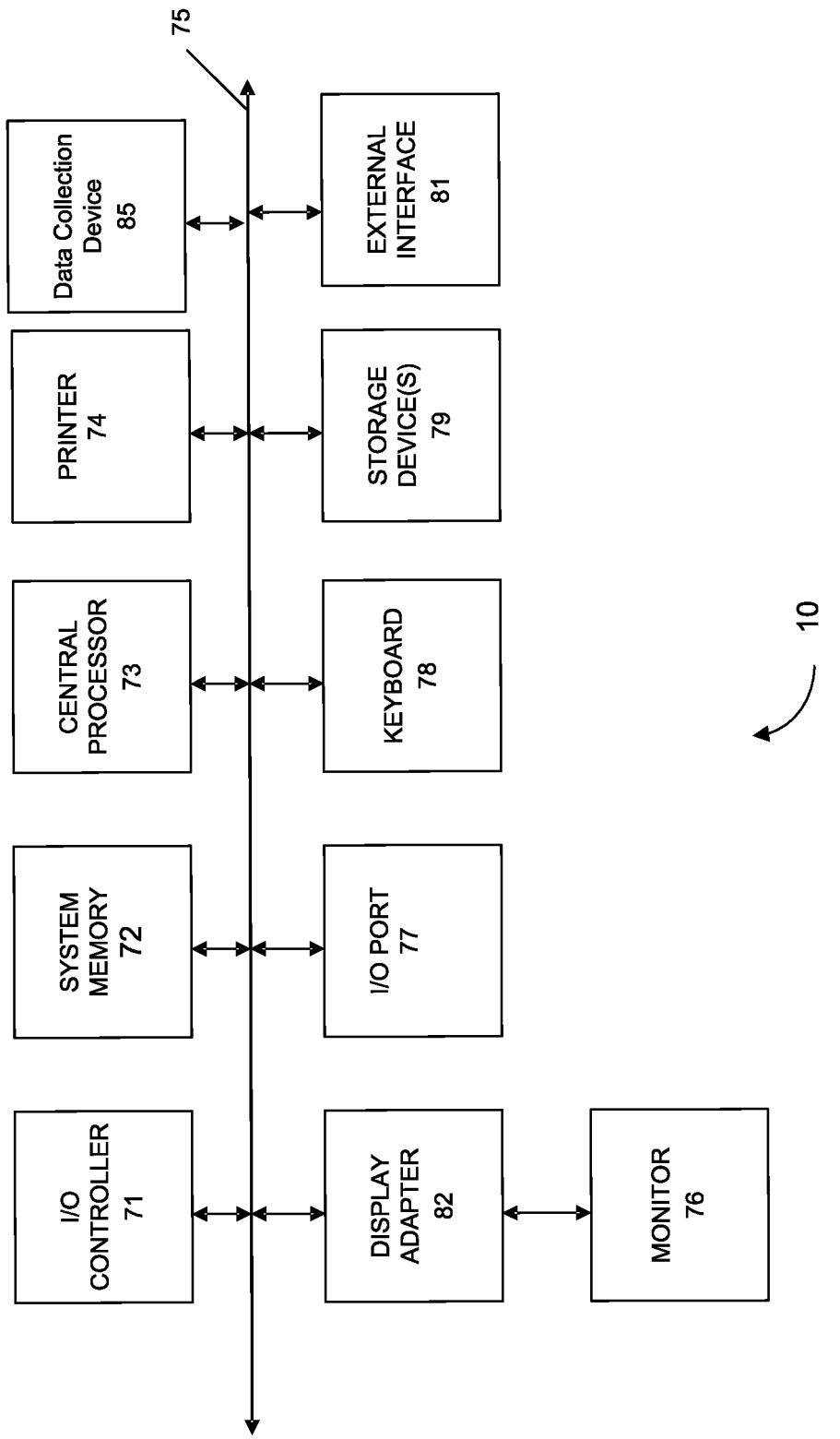
FIG. 16 shows a block diagram of an example computer system usable with systems and methods according to embodiments of the present disclosure.

Any of the computer systems mentioned herein may utilize any suitable number of subsystems. Examples of such subsystems are shown in FIG. 16 in computer system 10. In some embodiments, a computer system includes a single computer apparatus, where the subsystems can be the components of the computer apparatus. In other embodiments, a computer system can include multiple computer apparatuses, each being a subsystem, with internal components. A computer system can include desktop and laptop computers, tablets, mobile phones and other mobile devices.

The subsystems shown in FIG. 16 are interconnected via a system bus 75. Additional subsystems such as a printer 74, keyboard 78, storage device(s) 79, monitor 76 (e.g., a display screen, such as an LED), which is coupled to display adapter 82, and others are shown. Peripherals and input/output (I/O) devices, which couple to I/O controller 71, can be connected to the computer system by any number of means known in the art such as input/output (I/O) port 77 (e.g., USB, FireWire©). For example, I/O port 77 or external interface 81 (e.g. Ethernet, Wi-Fi, etc.) can be used to connect computer system 10 to a wide area network such as the Internet, a mouse input device, or a scanner. The interconnection via system bus 75 allows the central processor 73 to communicate with each subsystem and to control the execution of a plurality of instructions from system memory 72 or the storage device(s) 79 (e.g., a fixed disk, such as a hard drive, or optical disk), as well as the exchange of information between subsystems. The system memory 72 and/or the storage device(s) 79 may embody a computer readable medium. Another subsystem is a data collection device 85, such as a camera, microphone, accelerometer, and the like. Any of the data mentioned herein can be output from one component to another component and can be output to the user.

A computer system can include a plurality of the same components or subsystems, e.g., connected together by external interface 81, by an internal interface, or via removable storage devices that can be connected and removed from one component to another component. In some embodiments, computer systems, subsystem, or apparatuses can communicate over a network. In such instances, one computer can be considered a client and another computer a server, where each can be part of a same computer system. A client and a server can each include multiple systems, subsystems, or components.

Aspects of embodiments can be implemented in the form of control logic using hardware circuitry (e.g. an application specific integrated circuit or field programmable gate array) and/or using computer software with a generally programmable processor in a modular or integrated manner. As used herein, a processor can include a single-core processor, multi-core processor on a same integrated chip, or multiple processing units on a single circuit board or networked, as well as dedicated hardware. Based on the disclosure and teachings provided herein, a person of ordinary skill in the art will know and appreciate other ways and/or methods to implement embodiments of the present disclosure using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission. A suitable non-transitory computer readable medium can include random access memory (RAM), a read only memory (ROM), a magnetic medium such as a hard-drive or a floppy disk, or an optical medium such as a compact disk (CD) or DVD (digital versatile disk) or Blu-ray disk, flash memory, and the like. The computer readable medium may be any combination of such devices. In addition, the order of operations may be re-arranged. A process can be terminated when its operations are completed, but could have additional steps not included in a figure. A process may correspond to a method, a function, a procedure, a subroutine, a subprogram, etc. When a process corresponds to a function, its termination may correspond to a return of the function to the calling function or the main function Such programs may also be encoded and transmitted using carrier signals adapted for transmission via wired, optical, and/or wireless networks conforming to a variety of protocols, including the Internet. As such, a computer readable medium may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

Any of the methods described herein may be totally or partially performed with a computer system including one or more processors, which can be configured to perform the steps. Thus, embodiments can be directed to computer systems configured to perform the steps of any of the methods described herein, potentially with different components performing a respective step or a respective group of steps. Although presented as numbered steps, steps of methods herein can be performed at a same time or at different times or in a different order. Additionally, portions of these steps may be used with portions of other steps from other methods. Also, all or portions of a step may be optional. Additionally, any of the steps of any of the methods can be performed with modules, units, circuits, or other means of a system for performing these steps.

The specific details of particular embodiments may be combined in any suitable manner without departing from the spirit and scope of embodiments of the disclosure. However, other embodiments of the disclosure may be directed to specific embodiments relating to each individual aspect, or specific combinations of these individual aspects.

The above description of example embodiments of the present disclosure has been presented for the purposes of illustration and description. It is not intended to be exhaustive or to limit the disclosure to the precise form described, and many modifications and variations are possible in light of the teaching above.

A recitation of "a", "an" or "the" is intended to mean "one or more" unless specifically indicated to the contrary. The use of "or" is intended to mean an "inclusive or," and not an "exclusive or" unless specifically indicated to the contrary. Reference to a "first" component does not necessarily require that a second component be provided. Moreover, reference to a "first" or a "second" component does not limit the referenced component to a particular location unless expressly stated. The term "based on" is intended to mean "based at least in part on." When a Markush group or other grouping is used herein, all individual members of the group and all combinations and subcombinations possible of the group are intended to be individually included in the disclosure.

All patents, patent applications, publications, and descriptions mentioned herein are incorporated by reference in their entirety for all purposes. None is admitted to be prior art. Where a conflict exists between the instant application and a reference provided herein, the instant application shall dominate.

VIII. References

[1] Martin J A, Hamilton B E, Osterman M J K, Driscoll A K, Drake P. Births: Final Data for 2017. National Vital Statistics Reports. 2018 November; 67:8.

[2] Karlstrom A, Lindgren H, Hildingsson I. Maternal and infant outcome after caesarean section without recorded medical indication: findings from a Swedish case-control study [Journal Article]. BJOG. 2013; 120(4):479-86; discussion 486.

[3] Pallasmaa N, Ekblad U, Aitokallio-Tallberg A, Uotila J, Raudaskoski T, Ulander V M, et al. Cesarean delivery in Finland: maternal complications and obstetric risk factors [Journal Article]. Acta Obstet Gynecol Scand. 2010; 89(7):896-902.

[4] Villar J, Carroli G, Zavaleta N, Donner A, Wojdyla D, Faundes A, et al. Maternal and neonatal individual risks and benefits associated with caesarean delivery: multicentre prospective study [Journal Article]. BMJ. 2007; 335(7628):1025.

[5] Hager R M, Daltveit A K, Hofoss D, Nilsen S T, Kolaas T, Oian P, et al. Complications of cesarean deliveries: rates and risk factors [Journal Article]. Am J Obstet Gynecol. 2004; 190(2):428-34.

[6] Hall M H, Bewley S. Maternal mortality and mode of delivery [Journal Article]. Lancet. 1999; 354(9180):776.

[7] van Ham MAPC, van Dongen P W J, Mulder J. Maternal consequences of caesarean section. A retrospective study of intra-operative and postoperative maternal complications of caesarean section during a 10-year period [Journal Article]. Eur J Obstet Gynecol Reprod Biol. 1997; 74(1):1-6.

[8] Centers for Disease Control and Prevention, Vital Statistics Online; 2019. https://www.cdc.gov/nchs/data_access/vitalstatsonline.htm #Births.

[9] McKinney W. Data Structures for Statistical Computing in Python. In: van der Walt S, Millman J, editors. Proceedings of the 9th Python in Science Conference; 2010. p. 51-56. Also, see pandas.pydata.org/pandas-docs/stable/index.html.

[10] Centers for Disease Control and Prevention. U.S. Standard Certificate of Live Birth; 2003. https://www.cdc.gov/nchs/data/dvs/birth11-03final-ACC.pdf Accessed 19 Aug. 2019.

[11] Harris D M, Harris S L. Chapter 3—Sequential logic design. In: Harris D M, Harris S L, editors. Digital Design and Computer Architecture. Burlington: Morgan Kaufmann; 2007. p. 103-165.

[12] Hastie T, Tibshirani R, Friedman J. The elements of statistical learning: data mining, inference, and prediction. Springer Science & Business Media; 2009.

[13] Schmidt M, Le Roux N, Bach F. Minimizing finite sums with the stochastic average gradient. Mathematical Programming. 2017; 162(1-2):83-112.

[14] Chen T, Guestrin C. XGBoost: A Scalable Tree Boosting System. In: Proceedings of the 22nd ACM SIGKDD International Conference on Knowledge Discovery and Data Mining. KDD '16. New York, NY, USA: ACM; 2016. p. 785-794.

[15] Freund Y, Schapire R E. A decision-theoretic generalization of on-line learning and an application to boosting. Journal of computer and system sciences. 1997; 55(1): 119-139.

[16] Pedregosa F, Varoquaux G, Gramfort A, Michel V, Thirion B, Grisel O, et al. Scikit-learn: Machine Learning in Python. Journal of Machine Learning Research. 2011; 12:2825-2830. Also, see scikit-learn.org/stable/index.html.

[17] Ganganwar V. An overview of classification algorithms for imbalanced datasets. International Journal of Emerging Technology and Advanced Engineering. 2012; 2(4): 42-47.

[18] Lundberg S M, Lee S I. A Unified Approach to Interpreting Model Predictions. In: Guyon I, Luxburg U V, Bengio S, Wallach H, Fergus R, Vishwanathan S, et al., editors. Advances in Neural Information Processing Systems 30. Curran Associates, Inc.; 2017. p. 4765-4774.

[19] Breiman L. Classification and Regression Trees. Routledge; 2017.

[20] Niculescu-Mizil A, Caruana R. Predicting good probabilities with supervised learning. In: Proceedings of the 22nd international conference on Machine learning. ACM; 2005. p. 625-632.

[21] Dal Pozzolo A, Caelen O, Johnson R A, Bontempi G. Calibrating probability with under-sampling for unbalanced classification. In: 2015 IEEE Symposium Series on Computational Intelligence. IEEE; 2015. p. 159-166.

[22] Lundberg S M, Nair B, Vavilala M S, Horibe M, Eisses M J, Adams T, et al. Explainable machine-learning predictions for the prevention of hypoxaemia during surgery. Nature Biomedical Engineering. 2018; 2(10):749.

[23] Curtin S C, Gregory K, Korst L, Uddin S. Maternal Morbidity for Vaginal and Cesarean Deliveries, According to Previous Cesarean History: New Data From the Birth Certificate, 2013. National vital statistics reports: from the Centers for Disease Control and Prevention, National Center for Health Statistics, National Vital Statistics System. 2015; 64(4):1-13.

[24] ACOG Committee Opinion No. 761: Cesarean Delivery on Maternal Request [Journal Article]. Obstet Gynecol. 2019; 133(1):e73-e77.

[25] Bick D. Caesarean Section. Clinical Guideline. National Collaborating Centre for Women's and Children's Health: Worldviews on Evidence-Based Nursing. 2004; 1(3):198-199.

[26] Sobhy S, Arroyo-Manzano D, Murugesu N, Karthikeyan G, Kumar V, Kaur I, et al. Maternal and perinatal mortality and complications associated with caesarean section in low-income and middle-income countries: a systematic review and meta-analysis [Journal Article]. Lancet. 2019; 393(10184):1973-1982.

[27] Grobman W A, Lai Y, Landon M B, Spong C Y, Leveno K J, Rouse D J, et al. Development of a nomogram for prediction of vaginal birth after cesarean delivery. Obstetrics & Gynecology. 2007; 109(4):806-812.

[28] Guo C, Pleiss G, Sun Y, Weinberger K Q. On calibration of modern neural networks. In: Proceedings of the 34th International Conference on Machine Learning-Volume 70. JMLR. org; 2017. p. 1321-1330.

[29] Merkel D. Docker: Lightweight Linux Containers for Consistent Development and Deployment. Linux J. 2014 March; 2014(239).

[30] Schulz K, Baird R, Georgiou Y, Kurtzer G, Simmel D, and Nirmala Sundararajan T S, et al. Cluster Computing with OpenHPC. In: Proceedings of HPC Systems Professionals Workshop. HPCSYSPROS '16; 2016.

What is claimed is:

1. A method comprising:
receiving, at a computer system, characteristic values of a pregnancy of a subject;
storing, in the computer system, a machine learning model that receives a first set of input features and provides a second set of one or more output values, wherein the first set of input features correspond to the characteristic values of the pregnancy of the subject, and wherein the second set of one or more output values include a probability of a Cesarean delivery; and
inputting, by the computer system, the characteristic values into the machine learning model to obtain the probability of the Cesarean delivery being required for the subject during an attempt of a vaginal delivery;
combining the probability of the Cesarean delivery and a mortality or morbidity rate for an unplanned Cesarean delivery to obtain a first utility rate;
determining a second utility rate using a probability of the vaginal delivery and a mortality or morbidity rate for the vaginal delivery;
combining the first utility rate and the second utility rate to obtain an overall utility rate; and
performing the Cesarean delivery based on the probability of the Cesarean delivery and/or the overall utility rate.

2. The method of claim 1, wherein the characteristic values include a numerical value for a live birth order of the pregnancy for the subject.

3. The method of claim 1, wherein the subject has not had a previous Cesarean delivery.

4. The method of claim 1, further comprising:
providing, via a user interface, the probability of the Cesarean delivery.

5. The method of claim 1, wherein the Cesarean delivery is performed without attempting the vaginal delivery.

6. The method of claim 1, wherein the Cesarean delivery is performed after attempting the vaginal delivery, the method further comprising:
measuring properties of the pregnancy during a trial of labor to obtain one or more measured properties, wherein the characteristic values of the pregnancy of the subject include the one or more measured properties.

7. The method of claim 6, wherein the one or more measured properties include at least one selected from a group consisting of one or more vital signs of a fetus and/or one or more measures of progress of labor.

8. The method of claim 1, wherein the machine learning model includes at least 15 input features.

9. The method of claim 8, wherein the at least 15 input features include an age of the subject, a body mass index of the subject, whether a previous Cesarean delivery occurred for the subject, a race, ethnicity and/or national origin of the subject, a usage of tobacco by the subject, and a pre-pregnancy weight of the subject, pre-pregnancy diabetes, and pre-pregnancy hypertension.

10. The method of claim 8, wherein the at least 15 input features include at least one characteristic of the pregnancy obtained during a third trimester or near delivery, the at least 15 input features including a body mass index of the subject, an age of the subject, whether a previous Cesarean delivery occurred for the subject, a weight gain of the subject during the pregnancy, a gestational age, a race, ethnicity and/or national origin of the subject, a gestational hypertension status, a usage of tobacco by the subject, a number of prenatal visits, a pre-pregnancy weight of the subject, a gestational diabetes status, and a gestational age at delivery.

11. The method of claim 1, further comprising:
receiving training data including the first set of input features for training samples to which an output label is known, the output label including the vaginal delivery or the Cesarean delivery; and
training, using the training data, the machine learning model.

12. The method of claim 11, wherein training the machine learning model includes:
determining a proportion of the training samples having the output label of the Cesarean delivery, wherein the proportion is less than 50 percent; and
weighting, based on the proportion, a first group of training samples having the output label of the Cesarean delivery higher than a second group of training samples having the output label of the vaginal delivery.

13. The method of claim 1, wherein the machine learning model includes one or more decision trees.

14. The method of claim 1, further comprising:
determining importance values for the first set of input features; and
providing the importance value on a user interface of the computer system.

15. The method of claim 1, further comprising:
comparing the overall utility rate to an expected utility rate for a planned Cesarean delivery to determine a preferred mode of delivery.

16. The method of claim 1, further comprising:
providing, via a user interface, the overall utility rate accounting for an individual risk of mortality and morbidity to the subject and a baby.

17. The method of claim 1, wherein the Cesarean delivery is determined based on the overall utility rate.

18. The method of claim 1, wherein the Cesarean delivery is determined based on the probability of the Cesarean delivery.

19. A computer product comprising a non-transitory computer readable medium storing a plurality of instructions that, when executed, control a computer system to perform a method comprising:
receiving, at the computer system, characteristic values of a pregnancy of a subject;
storing, in the computer system, a machine learning model that receives a first set of input features and provides a second set of one or more output values, wherein the first set of input features correspond to the characteristic values of the pregnancy of the subject, and wherein the second set of one or more output values include a probability of a Cesarean delivery; and
inputting, by the computer system, the characteristic values into the machine learning model to obtain the probability of the Cesarean delivery being required for the subject during an attempt of a vaginal delivery;
combining the probability of the Cesarean delivery and a mortality or morbidity rate for an unplanned Cesarean delivery to obtain a first utility rate;
determining a second utility rate using a probability of the vaginal delivery and a mortality or morbidity rate for the vaginal delivery;
combining the first utility rate and the second utility rate to obtain an overall utility rate; and
instructing to perform the Cesarean delivery based on the probability of the Cesarean delivery and/or the overall utility rate.

* * * * *